(12) United States Patent
Humphries et al.

(10) Patent No.: US 10,074,111 B2
(45) Date of Patent: Sep. 11, 2018

(54) AUTOMATICALLY DETERMINING A CURRENT VALUE FOR A HOME

(71) Applicant: Zillow, Inc., Seattle, WA (US)

(72) Inventors: Stanley B. Humphries, Sammamish, WA (US); Dong Xiang, Sammamish, WA (US); Kyusik Chung, Seattle, WA (US); Jonathan Lee Burstein, Seattle, WA (US)

(73) Assignee: Zillow, Inc., Seattle, WA (US)

(*) Notice: Subject to any disclaimer, the term of this patent is extended or adjusted under 35 U.S.C. 154(b) by 0 days.

(21) Appl. No.: 14/167,962

(22) Filed: Jan. 29, 2014

(65) Prior Publication Data

US 2014/0236845 A1 Aug. 21, 2014

Related U.S. Application Data

(63) Continuation of application No. 11/347,000, filed on Feb. 3, 2006, now Pat. No. 8,676,680.

(51) Int. Cl.
*G06Q 40/00* (2012.01)
*G06Q 30/02* (2012.01)
*G06Q 50/16* (2012.01)

(52) U.S. Cl.
CPC ......... *G06Q 30/0278* (2013.01); *G06Q 30/02* (2013.01); *G06Q 50/16* (2013.01)

(58) Field of Classification Search
CPC .................................................... G06Q 40/00
USPC ........................................................ 705/35–45
See application file for complete search history.

(56) References Cited

U.S. PATENT DOCUMENTS

| | | |
|---|---|---|
| 4,870,576 A | 9/1989 | Tornetta |
| 5,361,201 A | 11/1994 | Jost et al. |
| 5,414,621 A | 5/1995 | Hough |
| 5,584,025 A | 12/1996 | Keithley et al. |
| 5,680,305 A | 10/1997 | Apgar, IV |
| 5,754,850 A | 5/1998 | Janssen |
| 5,794,216 A | 8/1998 | Brown |
| 5,857,174 A | 1/1999 | Dugan |
| 6,115,694 A | 9/2000 | Cheetham et al. |

(Continued)

FOREIGN PATENT DOCUMENTS

| | | |
|---|---|---|
| EP | 1903491 A1 | 3/2008 |
| WO | WO-199524687 A1 | 9/1995 |

(Continued)

OTHER PUBLICATIONS

Vladimir Svetnik, "Random Forest: A Classification and Regression Tool for Compound Classification and QSAR Modeling" J. Chem. Inf. Computation pp. 1947-1958 (2003).*

(Continued)

*Primary Examiner* — Hai Tran
(74) *Attorney, Agent, or Firm* — Perkins Coie LLP

(57) ABSTRACT

A facility for valuing a distinguished home located in a distinguished geographic area is described. The facility receives home attributes for the distinguished home. The facility obtains valuation for the distinguished home by applying to the received home attributes evaluation model for homes in the distinguished geographic area that has been trained using selling price and home attribute data from homes recently sold in the distinguished geographic area. The facility reports the obtained valuation for the distinguished home.

25 Claims, 11 Drawing Sheets

(56) References Cited

U.S. PATENT DOCUMENTS

| | | |
|---|---|---|
| 6,178,406 B1 | 1/2001 | Cheetham et al. |
| 6,240,425 B1 | 5/2001 | Naughton |
| 6,397,208 B1 | 5/2002 | Lee |
| 6,401,070 B1 | 6/2002 | McManus et al. |
| 6,446,261 B1 | 9/2002 | Rosser |
| 6,597,983 B2 | 7/2003 | Hancock |
| 6,609,118 B1* | 8/2003 | Khedkar et al. ............ 705/36 R |
| 6,615,187 B1 | 9/2003 | Ashenmil |
| 6,760,707 B2 | 7/2004 | Provost |
| 6,876,955 B1 | 4/2005 | Fleming et al. |
| 6,877,015 B1 | 4/2005 | Kilgore et al. |
| 6,915,206 B2 | 7/2005 | Sasajima |
| 7,092,918 B1 | 8/2006 | Delurgio et al. |
| 7,120,599 B2 | 10/2006 | Keyes |
| 7,130,810 B2 | 10/2006 | Foster et al. |
| 7,219,078 B2 | 5/2007 | Lamont et al. |
| 7,249,146 B2 | 7/2007 | Brecher |
| 7,289,965 B1 | 10/2007 | Bradley et al. |
| 7,454,355 B2 | 11/2008 | Milman et al. |
| 7,461,265 B2 | 12/2008 | Ellmore |
| 7,487,114 B2 | 2/2009 | Florance et al. |
| 7,567,262 B1 | 7/2009 | Clemens et al. |
| 7,711,574 B1 | 5/2010 | Bradley et al. |
| 7,725,359 B1 | 5/2010 | Katzfey et al. |
| 7,783,562 B1 | 8/2010 | Ellis |
| 7,788,186 B1 | 8/2010 | An et al. |
| 7,848,966 B2 | 12/2010 | Charuk et al. |
| 7,933,798 B1 | 4/2011 | Yan et al. |
| 7,970,674 B2 | 6/2011 | Cheng et al. |
| 8,001,024 B2 | 8/2011 | Graboske et al. |
| 8,032,401 B2 | 10/2011 | Choubey |
| 8,051,089 B2 | 11/2011 | Gargi et al. |
| 8,095,434 B1 | 1/2012 | Puttick et al. |
| 8,140,421 B1 | 3/2012 | Humphries et al. |
| 8,180,697 B2 | 5/2012 | Frischer |
| 8,190,516 B2 | 5/2012 | Ghosh et al. |
| 8,370,267 B2 | 2/2013 | Carey et al. |
| 8,401,877 B2 | 3/2013 | Salvagio |
| 8,473,347 B1 | 6/2013 | Koningstein |
| 8,515,839 B2 | 8/2013 | Ma et al. |
| 8,521,619 B2 | 8/2013 | Perry, III et al. |
| 8,583,562 B1 | 11/2013 | McDaniel et al. |
| 8,628,151 B1 | 1/2014 | Allen et al. |
| 8,650,067 B1 | 2/2014 | Moss |
| 8,660,919 B2 | 2/2014 | Kasower |
| 8,775,300 B2 | 7/2014 | Showalter |
| 9,536,011 B1 | 1/2017 | Kirillov |
| 2001/0039506 A1 | 11/2001 | Robbins |
| 2001/0044766 A1 | 11/2001 | Keyes |
| 2002/0035520 A1 | 3/2002 | Weiss |
| 2002/0082903 A1 | 6/2002 | Yasuzawa |
| 2002/0087389 A1 | 7/2002 | Sklarz et al. |
| 2002/0188689 A1 | 12/2002 | Michael |
| 2003/0004781 A1 | 1/2003 | Mallon et al. |
| 2003/0046099 A1 | 3/2003 | Lamont et al. |
| 2003/0078878 A1 | 4/2003 | Opsahl-Ong |
| 2003/0078897 A1 | 4/2003 | Florance et al. |
| 2003/0101063 A1 | 5/2003 | Sexton et al. |
| 2003/0101074 A1 | 5/2003 | Suzuki et al. |
| 2003/0110122 A1 | 6/2003 | Nalebuff et al. |
| 2003/0149658 A1 | 8/2003 | Rossbach et al. |
| 2003/0191723 A1 | 10/2003 | Foretich et al. |
| 2003/0212565 A1 | 11/2003 | Badali et al. |
| 2004/0019517 A1 | 1/2004 | Sennott |
| 2004/0030616 A1 | 2/2004 | Florance et al. |
| 2004/0039629 A1 | 2/2004 | Hoffman et al. |
| 2004/0049440 A1 | 3/2004 | Shinoda et al. |
| 2004/0054605 A1 | 3/2004 | Whittet |
| 2004/0073508 A1 | 4/2004 | Foster et al. |
| 2004/0117110 A1* | 6/2004 | Sasajima ........................ 701/208 |
| 2004/0128215 A1 | 7/2004 | Florance et al. |
| 2004/0153330 A1 | 8/2004 | Miller et al. |
| 2004/0220872 A1 | 11/2004 | Pollock |
| 2004/0243470 A1 | 12/2004 | Ozer et al. |
| 2005/0071376 A1 | 3/2005 | Modi |
| 2005/0080702 A1 | 4/2005 | Modi |
| 2005/0108084 A1 | 5/2005 | Ramamoorti et al. |
| 2005/0154656 A1 | 7/2005 | Kim et al. |
| 2005/0154657 A1* | 7/2005 | Kim et al. ...................... 705/30 |
| 2005/0187778 A1 | 8/2005 | Mitchell |
| 2005/0240429 A1 | 10/2005 | Dieden et al. |
| 2005/0254803 A1 | 11/2005 | Ono |
| 2005/0288942 A1 | 12/2005 | Graboske et al. |
| 2005/0288957 A1 | 12/2005 | Eraker et al. |
| 2006/0015357 A1 | 1/2006 | Cagan |
| 2006/0020424 A1 | 1/2006 | Quindel |
| 2006/0080114 A1 | 4/2006 | Bakes et al. |
| 2006/0085210 A1 | 4/2006 | Owens |
| 2006/0089842 A1 | 4/2006 | Medawar |
| 2006/0105342 A1 | 5/2006 | Villena et al. |
| 2006/0122918 A1 | 6/2006 | Graboske et al. |
| 2006/0167710 A1 | 7/2006 | King et al. |
| 2006/0248555 A1 | 11/2006 | Eldering |
| 2007/0005373 A1 | 1/2007 | Villena et al. |
| 2007/0043770 A1 | 2/2007 | Goodrich et al. |
| 2007/0050342 A1 | 3/2007 | Inkinen et al. |
| 2007/0067180 A1 | 3/2007 | James et al. |
| 2007/0106523 A1 | 5/2007 | Eaton et al. |
| 2007/0124235 A1* | 5/2007 | Chakraborty et al. .......... 705/38 |
| 2007/0132727 A1 | 6/2007 | Garbow et al. |
| 2007/0143132 A1 | 6/2007 | Linne et al. |
| 2007/0143312 A1 | 6/2007 | Wiseman |
| 2007/0185727 A1 | 8/2007 | Ma et al. |
| 2007/0185906 A1 | 8/2007 | Humphries et al. |
| 2007/0198278 A1 | 8/2007 | Cheng et al. |
| 2007/0255581 A1 | 11/2007 | Otto et al. |
| 2008/0004893 A1 | 1/2008 | Graboske et a. |
| 2008/0015890 A1 | 1/2008 | Malyala |
| 2008/0077458 A1 | 3/2008 | Andersen et al. |
| 2008/0255921 A1 | 10/2008 | Flake et al. |
| 2008/0288335 A1 | 11/2008 | Goldberg |
| 2008/0301064 A1 | 12/2008 | Burns |
| 2009/0006185 A1 | 1/2009 | Stinson |
| 2009/0030707 A1 | 1/2009 | Green |
| 2009/0030864 A1 | 1/2009 | Pednault et al. |
| 2009/0043603 A1 | 2/2009 | Rutherford et al. |
| 2009/0043637 A1 | 2/2009 | Eder |
| 2009/0048938 A1 | 2/2009 | Du Pray |
| 2009/0132316 A1 | 5/2009 | Florance et al. |
| 2009/0144097 A1 | 6/2009 | Fassio et al. |
| 2009/0150216 A1 | 6/2009 | Milman et al. |
| 2009/0164464 A1 | 6/2009 | Carrico et al. |
| 2009/0210287 A1 | 8/2009 | Chickering et al. |
| 2009/0240586 A1 | 9/2009 | Ramer et al. |
| 2010/0005019 A1 | 1/2010 | Yang et al. |
| 2010/0094548 A1 | 4/2010 | Tadman et al. |
| 2010/0114678 A1 | 5/2010 | Axe et al. |
| 2010/0161498 A1 | 6/2010 | Walker |
| 2010/0318451 A1 | 12/2010 | Niccolini |
| 2011/0066510 A1 | 3/2011 | Talegon |
| 2011/0196762 A1 | 8/2011 | DuPont |
| 2011/0218934 A1 | 9/2011 | Elser |
| 2011/0218937 A1 | 9/2011 | Elser |
| 2011/0251967 A1 | 10/2011 | Klivington |
| 2011/0270779 A1 | 11/2011 | Showalter |
| 2012/0005111 A2 | 1/2012 | Lowenstein et al. |
| 2012/0011075 A1 | 1/2012 | Graboske et al. |
| 2012/0030092 A1 | 2/2012 | Marshall et al. |
| 2012/0072357 A1 | 3/2012 | Bradford et al. |
| 2012/0078770 A1 | 3/2012 | Hecht |
| 2012/0158459 A1 | 6/2012 | Villena et al. |
| 2012/0191541 A1 | 7/2012 | Yang et al. |
| 2012/0254045 A1 | 10/2012 | Orfano |
| 2012/0311431 A1 | 12/2012 | Breaker et al. |
| 2012/0323798 A1 | 12/2012 | Den Herder et al. |
| 2013/0103459 A1 | 4/2013 | Marshall et al. |
| 2013/0159166 A1 | 6/2013 | Irick |
| 2013/0304654 A1 | 11/2013 | Ma et al. |
| 2013/0332877 A1 | 12/2013 | Florance et al. |
| 2014/0012720 A1 | 1/2014 | O'Kane |
| 2014/0279692 A1 | 9/2014 | Boothby et al. |
| 2014/0316857 A1 | 10/2014 | Roberts |
| 2014/0372203 A1 | 12/2014 | Powell et al. |

(56) References Cited

U.S. PATENT DOCUMENTS

| | | | |
|---|---|---|---|
| 2015/0149275 A1 | 5/2015 | Bax et al. | |
| 2015/0356576 A1 | 12/2015 | Malaviya et al. | |
| 2015/0379588 A1 | 12/2015 | Ma et al. | |

FOREIGN PATENT DOCUMENTS

| | | |
|---|---|---|
| WO | WO-2000055771 A1 | 9/2000 |
| WO | WO-200211038 A1 | 2/2002 |
| WO | WO-2002042980 A1 | 5/2002 |
| WO | WO-2003100692 A1 | 12/2003 |
| WO | WO-2005015441 A2 | 2/2005 |
| WO | WO-2006025830 A1 | 3/2006 |
| WO | WO-2006043951 A2 | 4/2006 |
| WO | WO-2007051892 A1 | 5/2007 |

OTHER PUBLICATIONS

Robert T. Meyer "The Learning of Multiattribute Judgment Policies" Journal of Consumer Research, Sep. 1987 pp. 155-173.*
Final Written Decision for U.S. Pat. No. 7,970,674, Case IPR2013-00034, Entered Mar. 27, 2014, 44 pages.
U.S. Appl. No. 14/191,388, filed Feb. 26, 2014, Ma et al.
Declaration of Steven R. Kursh, Ph.D., CSDP, CLP, CBM2014-00115, Filed Apr. 10, 2014, 108 pages.
Petition for Covered Business Method Patent Review for U.S. Pat. No. 7,970,674, CBM2014-00115, Apr. 10, 2014, 69 pages.
U.S. Appl. No. 14/318,536, filed Jun. 27, 2014, Cheng et al.
U.S. Appl. No. 14/325,094, filed Jul. 7, 2014, Bruce et al.
Notice of Allowance for U.S. Appl. No. 14/191,388, dated Jun. 25, 2014, 9 pages.
Notice of Appeal for U.S. Pat. No. 7,970,674, Case IPR2013-00034, May 1, 2014, 5 pages.
Patent Owner's Response to the Petition for Covered Business Method Patent Review for U.S. Pat. No. 7,970,674, Case No. CBM2013-00056, Jun. 20, 2014, 72 pages.
Requirement Under Rule 105 for U.S. Appl. No. 11/927,623, Mail Date Jul. 2, 2014, 4 pages.
Non-Final Office Action for U.S. Appl. No. 13/044,480, dated Jul. 17, 2014, 31 pages.
Final Office Action for U.S. Appl. No. 13/417,804, dated Aug. 13, 2014, 14 pages.
Non-Final Office Action for U.S. Appl. No. 14/191,388, dated Aug. 7, 2014, 5 pages.
Non-Final Office Action for U.S. Appl. No. 14/318,536, dated Aug. 8, 2014, 38 pages.
Great Britain Search Report for GB0701944.1, dated Mar. 28, 2007, 3 pages.
Notice of Allowance for U.S. Appl. No. 11/524,048, dated Jul. 18, 2013, 10 pages.
ValuePoint4 Report; File No. 04040103629, Apr. 12, 2004, 3 pages.
U.S. Appl. No. 11/927,623, filed Oct. 29, 2007, Humphries et al.
U.S. Appl. No. 13/044,480, filed Mar. 9, 2011, Humphries et al.
U.S. Appl. No. 13/044,490, filed Mar. 9, 2011, Humphries et al.
U.S. Appl. No. 13/417,804, filed Mar. 12, 2012, Humphries et al.
U.S. Appl. No. 13/828,680, filed Mar. 14, 2013, Humphries et al.
U.S. Appl. No. 13/830,497, filed Mar. 14, 2013, Humphries et al.
U.S. Appl. No. 14/041,450, filed Sep. 30, 2013, Humphries et al.
"2002 Inman Innovator Award Nominees Announced," PR Newswire, Jul. 16, 2002, 3 pages.
"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.
"An Introduction to R," <http://web.archive.org/web/20060118050840/http://cran.r-project.org/doc/manuals/R-intro.html>, pp. 1-105 [internet archive date: Jan. 18, 2006].
"Banton Technologies Announces National Home Evaluation Coverage; Company's ValueWizard 3.0 Assesses All Regions of the United States," Business Wire, Jun. 10, 2003, [online] Retrieved from the Internet: URL: http://www.the free library.com/_/print/PrintArticle.aspx?id=102949279, 2 pages.
"Basis100 Partners to Offer Automated Valuation Service," Canada StockWatch, Jan. 27, 2004, 2 pages.
"Basis100 Partners with First American," PR Newswire, Jan. 27, 2004, 3 pages.
"Casa(TM) to Value More Than $100 Billion of Residential Real Estate in 2001—Leading Lenders Saving Big without Compromising Loan Quality," PR Newswire, May 21, 2001, 3 pages.
"Centre for Mathematical Sciences," Lund University, http://web.archive.org/web/20060101005103/http://www.maths.lth.se/, 1 page [internet archive date: Jan. 1, 2006].
"Directory of Valuation Providers, Your Source for Valuation Information," Zackin Publications Inc., 2004, 5 pages.
"First American Expands Real Estate Valuation Line, Aims to Increase Accuracy with Addition of Veros, Basis100 AVMs," Inman News, Mar. 15, 2004, 2 pages.
"First American Real Estate Solutions Experiences Record," PR Newswire, Nov. 4, 2002, 3 pages.
"First American Real Estate Solutions Releases ValuePoint4," PR Newswire, Oct. 21, 2002, 3 pages.
"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.
"Franchise Offering Circular for Prospective Franchisees, "U.S. Appraisal, Nov. 1, 1986, 87 pages.
"GMAC-RFC Selects First American Real Estate Solutions' ValuePoint(R)4 Automated Valuation Model (AVM)," PR Newswire, Jun. 28, 2004, 3 pages.
"HNC Software and RealQuest Team to Provide Widespread Automated Property Valuation; AREAS Users to Have Online Access to Texas MLS," Business Wire, Oct. 1, 1997, 3 pages.
"HomeAdvisor Ranks First in Gomez Poll," Realty Times, Jun. 13, 2001, 3 pages.
"HomeAdvisor Spin-Off Aims to Service Realty Industry," Directions on Microsoft, Apr. 24, 2000, 2 pages.
"HomeSeekers.com and MSN HomeAdvisor Provide Free Web Pages for All Real Estate Agents," PR Newswire, May 20, 1999, 3 pages.
"How do we value your home?," [online] CSWOnline, Retrieved from the Internet via the Wayback Machine dated Oct. 23, 1999, URL: http://w w w .csw online.com/method.shtml, 1 page.
"In Brief: HomeAdvisor Secures $100 Million in Equity Funding," Directions on Microsoft, Aug. 28, 2000, 1 page.
"Microsoft Real Estate Venture Gets Large Investment," The New York Times, Technology section, Aug. 23, 2000, 2 pages.
"MSN HomeAdvisor Becomes Most-Visited Home and Real Estate Web Site, According to Media Metrix," Microsoft News Center, Apr. 13, 2001, Retrieved from the Internet: URL: http://www.microsoft.com/enus/ news/press/2001/Apr01/04-13MarchTrafficPR.aspx?navV3Index=0, 2 pages.
"MSN HomeAdvisor Helps Real Estate Agents and Customers Feel Right at Home on the Internet," Microsoft News Center, Dec. 14, 1998, Retrieved from the Internet: URL: http://www.microsoft.com/enus/ news/features/1998/12-14msn.aspx?navV3Index=0, 2 pages.
"Nation's First Fully Interactive AVM Debuts in Las Vegas AVM News," PRweb press release, AVM News, Feb. 4, 2006, 1 page.
"NetNumina Solutions Creates Robust E-Business Solution for Leader in Real Estate Lending," PR Newswire, Aug. 16, 1999, 3 pages.
"Reis Inc.," Commercial Property News, vol. 18, Issue 6, Mar. 16, 2004, 2 pages.
"Reis, Inc. Launches Apartment Version of Online Valuation and Credit Risk Analysis Module," Business Wire, Nov. 7, 2002, 2 pages.
"RMBS: Guidelines for the Use of Automated Valuation Models for U.K. RMBS Transactions," Standard and Poors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.

(56) References Cited

OTHER PUBLICATIONS

"Sample CASA Report," [online] CSWOnline, Retrieved from the Internet via the Wayback Machine dated Nov. 6, 1999, URL: http://w w w .csw online.com/sample.shtml, 3 pages.
"Standard on Automated Valuation Models (AVMs)", International Association of Assessing Officers, Approved Sep. 2003, 36 pages.
"The Appraisal" Report, U.S.Appraisal, dated at least by Sep. 29, 1983, 4 pages.
"The Appraisal" Report, U.S.Appraisal, not dated, 4 pages.
"The Appraiser," Certificate of Copyright Registration, Jun. 25, 1982, 4 pages.
"The Appraiser," Certificate of Copyright Registration, Oct. 19, 1981, 3 pages.
"The Assessor" Demo Video, U.S.Appraisal, [Accessed for review on Jun. 21, 2013, *Zillow Inc* vs. *Trulia* Case No. 2:12-cv-01549-JLR], [Transcribed Oct. 8, 2013], 10 pages.
"The Assessor" Newsletter, US Appraisal, dated at least by Apr. 10, 1985, 4 pages.
"The Assessor" Source Code, U.S.Appraisal, [Accessed for review on Jun. 21, 2013, *Zillow Inc* vs. *Trulia* Case No. 2:12-cv-01549-JLR], 2,460 pages.
"The Assessor," Certificate of Copyright Registration, Feb. 2, 1984, 2 pages.
"The Comprehensive R Archive Network,", www.cran.r-project.org, http://web.archive.org/web/20050830073913/cran.r-project.org/banner.shtml, [internet archive date: Aug. 30, 2005], pp. 1-2.
"The R Project for Statistical Computing," www.r-project.org, http://web.archive.org/web/20060102073515/www.r-project.org/main.shtml, [internet archive date: Jan. 2, 2006], 1 page.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.
"Trulia Estimates," [online], Retrieved from the Internet via the Wayback Machine dated Jan. 16, 2013 on XXXX, URL:http//www.trulia.com/trulia_estimates/, 2 pages.
"Uniform Standards of Professional Appraisal Practice and Advisory Opinions 2005 Edition<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013]. Retrieved from the Internet via Internet Archive Wayback Machine: URL: web.archive.org/web/20051222120807/http://www.real-info.com/products_avm.asp?RISID=e8fc23a9a1189fbff9b968e8f86ccde6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
Appeal Brief for for U.S. Appl. No. 11/524,048, Aug. 9, 2010, 20 pages.
Assignment of Copyright to U.S.Appraisal by Flying Software, Inc., Jan. 2, 1982, 2 pages.
AVM News, Thomson Media, vol. 1, Issue 1 Jan. 2002, 23 pages.
AVM News, Thomson Media, vol. 1, Issue 10, Oct. 2002, 34 pages.
AVM News, Thomson Media, vol. 1, Issue 11, Nov. 2002, 28 pages.
AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 1-2, Jan.-Feb. 2011, 72 pages.
AVM News, Thomson Media, vol. 10, Issue 11-12, Nov.-Dec. 2011, 70 pages.
AVM News, Thomson Media, vol. 10, Issue 3-4, Mar.-Apr. 2011, 100 pages.
AVM News, Thomson Media, vol. 10, Issue 3-4, Mar.-Apr. 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVM News, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pages.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.
AVM News, Thomson Media, vol. 5, Issue 8, Aug. 2006, 57 pages.
AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.

(56) References Cited

OTHER PUBLICATIONS

AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.
AVM News, Thomson Media, vol. 7, Issue 4-5, May-Jun. 2008, 46 pages.
AVM News, Thomson Media, vol. 7, Issue 9-10, Sep.-Oct. 2008, 68 pages.
AVM News, Thomson Media, vol. 7, Isue 1, Jan. 2008, 44 pages.
AVM News, Thomson Media, vol. 8, Issue 1-2, Jan.-Feb. 2009, 71 pages.
AVM News, Thomson Media, vol. 8, Issue 11-12, Nov.-Dec. 2009, 62 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 1-2, Jan.-Feb. 2010, 66 pages.
AVM News, Thomson Media, vol. 9, Issue 11-12, Nov.-Dec. 2010, 75 pages.
AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Bailey, Martin J. et al., A Regression Method for Real Estate Price Index Construction, Journal of the American Statistical Association, vol. 58, No. 304 (Dec. 1963), pp. 933-942, 10 pages, Published by: American Statistical Association, Stable URL: http://www.jstor.org/stable/2283324, pp. 933-942, 11 pages.
Basch, Mark, "Basis100 Sold to California Firm," The Florida Times Union, Jacksonville.com, Jul. 1, 2004, 2 pages.
Bennett, Kristin P., "Support Vector Machines: Hype or Hallelujah?" SIGKDD Explorations, Dec. 2000, pp. 1-12, vol. 2, issue 2, ACM SIGKDD.
Borst, Richard A. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.
Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.

Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, pp. 1-28 [accessed Dec. 13, 2005].
Breiman, L., "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Calhoun, Charles A., "Property Valuation Methods and Data in the United States," Housing Finance International Journal 16.2, Dec. 2001, pp. 12-23.
Casa Property Valuation screen capture, dated at least by Jan. 24, 2005, 1 page.
Case, Karl E., et al., "Prices of Single Family Homes Since 1970: New Indexes for Four Cities," Cowles Foundation for Research in Economics at Yale University, New Haven, Connecticut, Discussion Paper No. 851, Oct. 1987, 54 pages.
Centre for Mathematical Sciences, Lund University, "Classification and Regression with Random Forest," http://web.archive.org/web/20060205051957/http://www.maths.lth.se/help/R/.R/library/randomForest/html/randomForest.html, pp. 1-4 [internet archive date: Feb. 5, 2006].
Complaint for Patent Infringement, Demand for Jury Trial for U.S. Pat. No. 7,970,674, Case 2:12-cv-01549-JLR, Sep. 12, 2012, 8 pages.
Cozzi, Guy, Real Estate Appraising from A to Z, 4th Edition, Nemmar Real Estate Training, Jan. 1, 2002, 226 pages.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Steven R. Kursh, Ph.D., CSDP, CLP, Aug. 2013, 9 pages.
Cypress Software Introduces AVM Module for Mark IV Application; Module Provides Instant Home Appraisal for Loans Processed by the Loan-Decisioning Platform, Business Wire, Nov. 15, 2005, 2 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, Mail Date Oct. 19, 2012, 7 pages.
Decision on Request for Rehearing for U.S. Pat. No. 7,970,674, Case No. IPR2013-00034, Apr. 22, 2013, 5 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstraqtegy, Case No. 3:11-06637-RS-PSG, Nov. 20, 2012, 4 pages.
Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, Sep. 11, 2013, 107 pages.
Defendant Trulia, Inc.'s Non-Infringement and Invalidity Contentions, Case No. 2:12-cV-01549-JLR, Jun. 21, 2013, 24 pages.
Defendant Trulia, Inc.'s Non-Infringement and Invalidity Contentions, Exhibit A, Case No. 2:12-cv-01549-JLR, Jun. 21, 2013, 267 pages.
Dempster, A.P. et al., "Maximum Likelihood from Incomplete Data via the Algorithm," Journal of the Royal Statistical Society, 1977, Series B 39 (1): 1-38, JSTOR 2984875, MR 0501537, [online], retrieved from the Internet: URL: http://www.jstor.org/stable/2984875?origin=JSTOR-pdf, 38 pages.

(56) References Cited

OTHER PUBLICATIONS

Department of the Treasury, Internal Revenue Service, "How to Depreciate Property," Publication 946, made available at www.irs.gov by dated at least 2004, 112 pages.
Deposition Transcription of John A. Kilpatrick, Ph.D., Aug. 8, 2013, 263 pages.
European Examination Report, Application No. 07018380.1, dated May 16, 2013, 6 pages.
European Examination Report, Application No. 07018380.1, dated Nov. 8, 2012, 6 pages.
Evaluation Services, Inc. Steps to Analysis, not dated, 15 pages.
Evaluation Services, Inc. Warranty to Lenders Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Evans, Blanche, The Hottest E-careers in Real Estate, Dearborn Financial Publishing Inc., 2000.
Examiner's Answer for U.S. Appl. No. 11/524,048, dated Oct. 28, 2010, 13 pages.
Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. 3-2003, Oct. 2003, 46 pages.
File History of U.S. Pat. No. 7,970,674, Dated Feb. 3, 2006-Apr. 2, 2013, 404 pages, Parts 1-4.
Final Office Action for U.S. Appl. No. 13/044,490, dated Mar. 14, 2013, 35 pages.
Final Office Action for U.S. Appl. No. 11/347,000, dated Jan. 3, 2012, 17 pages.
Final Office Action for U.S. Appl. No. 11/347,024, dated Feb. 3, 2011, 35 pages.
Final Office Action for U.S. Appl. No. 11/524,047, dated Jul. 12, 2010, 7 pages.
Final Office Action for U.S. Appl. No. 11/524,047, dated Sep. 28, 2012, 7 pages.
Final Office Action for U.S. Appl. No. 11/524,048, dated Dec. 8, 2009, 12 pages.
Final Office Action for U.S. Appl. No. 13/044,480, dated Feb. 19, 2014, 31 pages.
Final Office Action for U.S. Appl. No. 11/927,623, dated Sep. 19, 2011, 13 pages.
Finkelstein, Brad, "PlatinumData Improving Value of Its Information," Origination News and SourceMedia, Inc., vol. 15, Section: Special Report, Section:2, Nov. 1, 2005, 2 pages.
First American Real Estate Solutions Releases ValuePoint4, AVM News, Thomson Media, vol. 1, Issue 10, Oct. 2002, pp. 28-29.
First American Real Estate Solutions Releases ValuePoint4, PR Newswire, Oct. 21, 2002, 3 pages.
Fletcher, Jun., "High-Tech Is Coming for High-End House Sales," Wall Street Journal, Sep. 19, 1997, 1 page.
Fletcher, Jun., "On the Web: What's Your House Worth?," Wall Street Journal, Sep. 26, 1997, 1 page.
Fletcher, Jun., "Touring the Tangled Web of For-Sale-by-Owner Homes," The Wall Street Journal, Jun. 6, 1997, 1 page.
Freddi Mac's Home Value Explorer screen capture, dated at least by Jul. 15, 2003, 1 page.
Freddie Mac Form 70, Uniform Residential Appraisal Report, Federal Home Loan Mortgage Corporation [online], Mar. 2005, Retrieved from the Internet: URL: https://www.fanniemae.com/content/guide_form/1004.pdf, 8 pages.

Hill, T. and Lewicki, P., "K-Nearest Neighbors," Statistics Methods and Applications, 2007, http://www.statsoft.com/textbook/stknn.html, [internet accessed on [Dec. 6, 2007].
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Sellers, [online], Retrieved from the Internet via the Wayback Machine dated Dec. 10, 2005 on Jun. 19, 2013, URL: http://homesmartreports.com/hs_owners.htm, 1 page.
HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.
HomeSmartReports, [online], Retrieved from the Internet via the Wayback Machine dated Oct. 13, 2005 on Jun. 19, 2013, URL: http://homesmartreports.com/, 2 pages.
HomeSmartReports, [online], Retrieved from the Internet via the Wayback Machine dated Dec. 10, 2005 on Jun. 19, 2013, URL: http://homesmartreports.com/default.aspx, 1 page.
http://www.ics.uci.edu/~mlearn/databases/housing/housing.names, 1 page [accessed Dec. 13, 2005].
Infinite Regression, Certificate of Copyright Registration Filing, Apr. 2, 1984, 3 pages.
Internal Revenue Service Publication 946, "How to Depreciate Property," 2004, 112 pages.
Jensen, David L., "Alternative Modeling Techniques in Computer-Assisted Mass Appraisal," Property Tax Journal, vol. 6, No. 3, Sep. 1987, pp. 193-237.
Kilpatrick, John A., "The Future of Real Estate Information," Real Estate Issues, Spring 2001, 8 pages.
Kilpatrick, John A., et al., "House Price Impacts of School District Choice," South Carolina Center for Applied Real Estate Education and Research, Dec. 28, 1998, 25 pages.
Krasilovsky, Peter, "Chris Terrill Discusses ServiceMagic's Rebranding to 'Home Advisor'," Home Advisor, Oct. 17, 2012, 5 pages.
Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.
McCluskey, William J. et al., "An Evaluation of MRA, Comparable Sales Analysis, and ANNs for the Mass Apraisal of Residential Properties in Northern Ireland," Assessment Journal, Jan./Feb. 1997, 8 pages.
McGarity, M., "The Values Debate," Mortgage Banking, vol. 65, Issue 6, Mar. 1, 2005, 14 pages.
McWilliams, Charlyne H., "The Tale of AVMs," Mortgage Banking, vol. 64, Issue 5, Feb. 1, 2004, 7 pages.
Meyer, Robert T., "The Learning of Multiattribute Judgment Policies," The Journal of Consumer Research, vol. 14, No. 2, Sep. 1987, 20 pages.
Microstrategy Inc.'s Opposition to Plaintiff Vasudevan Software, Inc.'s Motion for Sanctions, Case No. 11-CV-06637-RS-PSG, Jan. 4, 2013, 23 pages.
Mobasher, B. "Classification Via Decision Trees in WEKA," DePaul University, Computer Science, Telecommunications, and Information Systems, ECT 584-Web Data Mining, 2005, http://maya.cs.depaul.edu/~classes/Ect584/WEKA/classify.html, 5 pages [internet accessed on Dec. 6, 2007].
Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.
Motion for Pro Hac Vice Admission and Exhibit A for U.S. Pat. No. 7,970,674, Case No. IPR2013-00034, Filing Date Dec. 17, 2012, 13 pages.
MSN House & Home—More Useful Everyday screen capture, [online], Retrieved from the Internet via the Wayback Machine dated Mar. 23, 2003 on Jun. 19, 2013, URL: http://web.archive.

(56) References Cited

OTHER PUBLICATIONS org/web/20030323183505/http://houseandhome.msn.com/, 2 pages.

Mullaney, Timothy J., "A new Home Site on the Block," Bloomberg Businessweek [online], Feb. 7, 2006, Retrieved from the Internet: URL: http://www.businessweek.com/stories/2006-02-07/a-new-home-site-on-the-block, 3 pages.

Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.

Non-Final Office Action for U.S. Appl. No. 13/044,490, dated Oct. 11, 2012, 30 pages.

Non-Final Office Action for U.S. Appl. No. 13/044,480, dated Oct. 24, 2013, 29 pages.

Non-Final Office Action for U.S. Appl. No. 11/347,000, dated Oct. 27, 2010, 23 pages.

Non-Final Office Action for U.S. Appl. No. 11/347,000, dated Nov. 23, 2012, 6 pages.

Non-Final Office Action for U.S. Appl. No. 11/347,000, dated Apr. 9, 2010, 18 pages.

Non-Final Office Action for U.S. Appl. No. 11/347,000, dated May 27, 2011, 13 pages.

Non-Final Office Action for U.S. Appl. No. 11/347,024, dated Dec. 10, 2009, 54 pages.

Non-Final Office Action for U.S. Appl. No. 11/347,024, dated May 13, 2010, 36 pages.

Non-Final Office Action for U.S. Appl. No. 11/524,047, dated May 7, 2012, 8 pages.

Non-Final Office Action for U.S. Appl. No. 11/524,047, dated Oct. 28, 2009, 12 pages.

Non-Final Office Action for U.S. Appl. No. 11/524,047, dated Jul. 8, 2011, 11 pages.

Non-Final Office Action for U.S. Appl. No. 11/524,048, dated Apr. 29, 2009, 10 pages.

Non-Final Office Action for U.S. Appl. No. 11/927,623, dated Dec. 28, 2010, 22 pages.

Non-Final Office Action for U.S. Appl. No. 13/417,804, dated Feb. 26, 2014, 13 pages.

Non-Final Office Action for U.S. Appl. No. 11/524,047, dated Nov. 4, 2013, 8 pages.

Notice of Allowability and Examiner-Initiated Interview Summary for U.S. Appl. No. 11/524,048, dated Jul. 3, 2013, 11 pages.

Notice of Allowance for U.S. Appl. No. 11/347,024, dated Apr. 18, 2011, 7 pages.

Notice of Allowance for U.S. Appl. No. 11/524,048, dated Feb. 25, 2013, 14 pages.

Notice of Allowance for U.S. Appl. No. 11/971,758, dated Nov. 10, 2011, 19 pages.

Notice of Allowance for U.S. Appl. No. 11/347,000, dated Oct. 24, 2013, 12 pages.

O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.

Oldham, Jennifer, "Pricing's Tangled Web, Consumers Using the Internet to Calculate Home Values Find that the Results—and Data They're Based on-Vary," Los Angeles Times, Jul. 30, 2000, 5 pages.

One-month Office Action for U.S. Appl. No. 11/347,000, dated Jul. 26, 2013, 6 pages.

Oral Hearing Transcript for U.S. Pat. No. 7,970,674, Case No. IPR2013-00034, Held Nov. 21, 2013, Entered Feb. 20, 2014, 96 pages.

Order Authorizing Motion for Pro Hac Vice Admission for U.S. Pat. No. 7,970,674, Case No. IPR2013-00034, Filing Date Jan. 3, 2013, 4 pages.

Pagourtzi, E. et al., "Real Estate Appraisal: A Review of Valuation Methods," Journal of Property Investment & Finance, vol. 21, No. 4, 2003, pp. 383-401.

PASS screen capture, dated at least by Oct. 20, 2004, 1 page.

Patent Owner's Observations on Cross Examination of Dr. Richard A. Borst, Ph.D., U.S. Pat. No. 7,970,674, Case IPR2013-00034, Oct. 10, 2013, 9 pages.

Patent Owner's Response to Revised Petition for Inter Partes Review for U.S. Pat. No. 7,970,674, Case No. IPR2013-00034, Jun. 14, 2013, 41 pages.

Petition for Covered Business Method Patent Review for U.S. Pat. No. 7,970,674, CBM2013-00056, Sep. 11, 2013, 87 pages.

Petition for Inter Partes Review for U.S. Pat. No. 7,970,674, Case No. IPR2013-00034, Mail Date Oct. 26, 2012, 65 pages.

Petitioner Response to Patent Owners Observations on Cross Examination of Dr. Richard A. Borst, Ph.D., U.S. Pat. No. 7,970,674, Case IPR2013-00034, Oct. 24, 2013, 7 pages.

Petitioner's Reply to Patent Owner Response to Petition, U.S. Pat. No. 7,970,674, Case No. IPR2013-00034, Aug. 26, 2013, 20 pages.

Plaintiff Vasudevan Software, Inc.'s Notice of Motion and Motion for Sanctions Against Microstrategy, Case No. 3:11-06637-RS-PSG, Dec. 12, 2012, 23 pages.

Plaintiff Vasudevan Software, Inc.'s Reply in Support of Motion for Sanctions Against Microstrategy, Case No. 3:11-06637-RS-PSG, Jan. 14, 2013, 25 pages.

Potharst, R. et al., "Classification Trees for Problems with Monotonicity Constraints," ACM SIGKDD Explorations Newsletter 4.1, 2002, pp. 1-10.

Potharst, R. et al., "Classification Trees for Problems with Monotonicity Constraints," ERIM Report Series Research in Management, Erasmus Research Institute of Mangement, Apr. 2002, 39 pages.

PowerBase 6.0 screen capture, dated at least by Oct. 20, 2004, 1 page.

Prasad, Nalini and Richard, Anthony, "Measuring Housing Price Growth—Using Stratification to Improve Median-based Measures", Reserve Bank of Australia, 2006, p. 1.

Preliminary Patent Owner Response and Exhibits for U.S. Pat. No. 7,970,674, Case No. IPR2013-00034, Feb. 15, 2013, 228 pages.

Preliminary Patent Owner Response for U.S. Pat. No. 7,970,674, Case No. CBM2013-00056, Dec. 18, 2013, 85 pages.

Preliminary Patent Owner Response for U.S. Pat. No. 7,970,674, Case No. IPR2013-00034, Feb. 15, 2013, 39 pages.

Quinlan, Ross J., "C4.5: Programs for Machine Learning," Machine Learning, 1993, pp. 302, Morgan Kaufmann Publishers, San Francisco, CA, USA.

Real-info.com, "What is an AVM," www.real-info.com/products_avm.asp? Internet Archive Date: Oct. 30, 2005, 5 pages [accessed Mar. 21, 2007].

RealEstateABC.com, see paragraph headed "How do I make the estimate more accurate?" www.realestateabc.com/home-values/_<http://www.realestateabc.com/home-values/>, Internet Archive Dated: Apr. 5, 2006, 4 pages [accessed Mar. 20, 2007].

RealQuest.com screen capture, dated at least by Dec. 12, 2002, 1 page.

RealQuest.com screen capture, dated at least by Oct. 20, 2004, 1 page.

RealQuest.com Vector screen capture, dated at least by Oct. 20, 2004, 1 page.

ReaQuest.com ValuePoint R4 Report screen capture, dated at least by Sep. 30, 2002, 1 page.

Reis SE 2.0 User Guide Book, Reis, 2004, 40 pages.

Reis SE 2.0 User Guide Book, Reis, 2005, 37 pages.

Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.

Reply Brief for for U.S. Appl. No. 11/524,048, Dec. 22, 2010, 6 pages.

Request for Rehearing for U.S. Pat. No. 7,970,674, Case No. IPR2013-00034, Apr. 16, 2013, 8 pages.

Response to Decision on Appeal for U.S. Appl. No. 11/524,048, Dec. 19, 2012, 7 pages.

Response to Final Office Action for U.S. Appl. No. 11/347/024, dated Mar. 4, 2011, 17 pages.

Revised Petition for Inter Partes Review for U.S. Pat. No. 7,970,674, Case No. IPR2013-00034, Mail Date Nov. 13, 2012, 55 pages.

(56) References Cited

OTHER PUBLICATIONS

Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.
Rye, Owen E., "A Multiple Criteria Analysis Model for Real Estate Evaluation," Journal of Global Optimization 12.2, Mar. 1998, pp. 197-214.
Rye, Owen E., "Automated Property Assessment," Transactions of the American Association of Cost Engineers, Nov. 2004, pp. 28-32.
Sample Appraisal Report of a Single-Family Residence, U.S. Appraisal, Sep. 15, 1982, 16 pages.
Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.
Sample Residential Appraisal Report, U.S.Appraisal, Jul. 16, 1982, 2 pages.
Simons, R. A., "Chapter 6: Valuation of Impaired Property," When Bad Things Happen to Good Property, Throupe, R. et al., Environmental Law Institute, May 2006, 30 pages.
Software Referral Agreement with Sole Source Provision between Sperry Corporation and U.S.Appraisal, May 1985, 47 pages.
Standard & Poors, "Guidelines for the use of Automated Valuation Models for U.K. RMBS Transactions," http://www.rics.org/NR/rdonlyres/8Fcdd20c-7FAC-4549-86FB-3930CD0CBC05/0/StandardandPoorsReportonAVMs.pdf, Published Feb. 20, 2004, 4 pages.
StatSoft, Inc., "Classification Trees," http://www.statsoft.com/textbook/stclatre.html, pp. 1-20, © 1984-2003 [accessed Dec. 13, 2005].
Svetnik et al., "Random Forest: A Classification and Regression Tool for Compound Classification and QSAR Modeling," J Chem Info. Computer Science, vol. 43, 2003, pp. 1947-1958.
System Operations Manual for "The Research Assistant", Evaluation Services, Inc., Feb. 12, 1997, 92 pages.
System Operations Manual, "The Research Assistant", Database Valuation Version, Evaluation Services, Inc., Feb. 12, 1997, 35 pages.
Tay et al., "Artificial Intelligence and the Mass Appraisal of Residential Apartments," Journal of Property Valuation and Investment, Feb. 1, 1992, 17 pages.
The Appraisal, An Automated Computerized Appraisal System, U.S.Appraisal, not dated, 4 pages.
The Appraiser, An Automatic Computerized Appraisal System, U.S.Appraisal, not dated, 4 pages.
The Assessor, A Computerized Assessment System, NCR Corporation, 1986, 6 pages.
The MicroAppraisal, Certificate of Copyright Registration, Feb. 2, 1984, 2 pages.
Transcript of Deposition of R. A. Borst, Ph. D., Case IPR2013-00034 (JL), Transcribed Sep. 19, 2013, 177 pages.
Transcript of Proceedings in Case No. C 11-06637 RS, Jan. 24, 2013, 24 pages.
U.S. Appraisal Business Plan, dated at least since Aug. 1, 1985, 30 pages.
U.S. Appraisal Offering Memorandum, Sep. 12, 1984, 66 pages.
U.S. Appraisal Profit and Loss Proforma, dated at least since Aug. 1, 1985, 38 pages.
Valuation Reports, Schedule A, U.S. Appraisal, dated at least by Nov. 1, 1986, 6 pages.
Valuations, Claims Cross Engines, Inman News Features, Dec. 10, 2002, 1 page.
ValueWizard screen capture, not dated, 1 page.
Vapnik et al., "Support-Vector Networks," Machine Learning, vol. 20, 1995, 25 pages.
VeroValue screen capture, dated at least by Sep. 30, 2004, 1 page.
Visual PAMSPro 2000, [online], Retrieved from the Internet via the Wayback Machine dated Mar. 4, 2001 on Jun. 19, 2013, URL: http://www.visualpamspro.com/prod01.htm, 2 pages.
Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.
Visual PAMSPro Downloads, [online], Retrieved from the Internet via the Wayback Machine dated Mar. 2, 2001 on Jun. 19, 2013, URL: http://www.visualpamspro.com/download.htm, 1 page.
Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the Wayback Machine dated Sep. 2, 2001 on Jun. 19, 2013, URL: http://www.visualpamspro.com/prodvpp2.htm, 6 pages.
Visual PAMSPro Tips and Tricks, [online], Retrieved from the Internet via the Wayback Machine dated Mar. 2, 2001 on Jun. 19, 2013, URL: http://www.visualpamspro.com/Tips-Tricks.htm, 1 page.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
www.cran.r-project.org, "The Comprehensive R Archive Network," http://web.archive.org/web/20050830073913/cran.r-project.org/banner.shtml, pp. 1-2 [internet archive date: Aug. 30, 2005].
www.r-project.org, "The R Project for Statistical Computing," http://web.archive.org/web/20060102073515/www.r-project.org/main.shtml, 1 page [internet archive date: Jan. 2, 2006].
Decision—Institution of Covered Business Method Patent Review for U.S. Pat. No. 7,970,674, Case CBM2013-00056, Entered Mar. 10, 2014, 36 pages.
U.S. Appl. No. 14/524,148, filed Oct. 27, 2014, Humphries et al.
Final Office Action for U.S. Appl. No. 14/191,388, dated Dec. 15, 2014, 12 pages.
Final Office Action for U.S. Appl. No. 14/318,536, dated Dec. 11, 2014, 47 pages.
Non-Final Office Action for U.S. Appl. No. 11/524,047, dated Dec. 1, 2014, 26 pages.
Non-Final Office Action for U.S. Appl. No. 13/044,490, dated Dec. 17, 2014, 30 pages.
Non-Final Office Action for U.S. Appl. No. 13/417,804, dated Jan. 28, 2015, 12 pages.
Non-Final Office Action for U.S. Appl. No. 13/943,604, dated Nov. 19, 2014, 24 pages.
Palmquist, Raymond B., "Alternative Techniques for Developing Real Estate Price Indexes," The Review of Economics and Statistics, vol. 62, No. 3 (Aug. 1980), pp. 442-448.
Redfin, https://web.archive.org/web/20060907212454/http :/ /www.redfin.com/stingray/do/terms-ofuse?rt=fn-tl, Wayback Machine Sep. 7, 2006.
Australian Examiner's First Report in Australian Patent Application 2007216858, dated Dec. 22, 2008, 2 pages.
CDR Business Solutions, LLC, What is RELAR, <http://www.relar.com/relarsystem.aspx> Aug. 24, 2011, Archived by Internet Wayback Machine <http://web.archive.org/web/20110824084613/http://www.relar.com/relarsystem.aspx> viewed Aug. 20, 2015, pp. 1-4.
European Examination Report, Application No. 07018380.1, dated Oct. 24, 2008, 6 pages.
FHFA, "Distress-Free House Price Indexes." https://www.fhfa.gov/DataTools/Downloads/Documents/HPI_Focus_Pieces/2012Q2_HPI_N508.pdf. Jul. 13, 2014.
Final Office Action for U.S. Appl. No. 11/524,047, dated Jun. 12, 2015, 31 pages.
Final Office Action for U.S. Appl. No. 13/044,480, dated Jul. 10, 2015, 35 pages.
Final Office Action for U.S. Appl. No. 13/044,490, dated May 7, 2015, 36 pages.
Final Office Action for U.S. Appl. No. 13/943,604, dated Mar. 6, 2015, 28 pages.

(56) References Cited

OTHER PUBLICATIONS

Final Office Action for U.S. Appl. No. 12/924,037, dated May 16, 2013, 11 pages.
Final Office Action for U.S. Appl. No. 12/924,037, dated Jun. 16, 2015, 19 pages.
Final Office Action for U.S. Appl. No. 13/417,804, dated Oct. 14, 2015, 11 pages.
Final Office Action for U.S. Appl. No. 13/828,680, dated Jul. 26, 2016, 59 pages.
Final Office Action for U.S. Appl. No. 13/843,577, dated Mar. 22, 2016, 63 pages.
Final Office Action for U.S. Appl. No. 14/078,076, dated Feb. 26, 2016, 21 pages.
Google, Google Trends, retrieved from the internet Oct. 12, 2015 <http://www.google.com/trends> (website address only—No document).
Great Britain Examination Report in Application No. GB0701944.1, dated May 5, 2010, 3 pages.
Indeed, Job Trends: Podcast, retrieved from the internet Oct. 12, 2015 <http://www.indeed.com/jobtrends> (website only—No document).
Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.
Jobster, Job Search Trends for Keywords and Locations, retrieved from the internet Oct. 12, 2015 <http://www.jobster.com/find/US/jon/search/trends> (website only—no document).
John Battelle's Searchblog,: The Database of Intentions, Nov. 13, 2003.
Leonhardt, David, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.
Melville, J., "How much should I charge to rent my house?", published Dec. 5, 2010, retrieved from http://homeguides.sfgate.com/much-should-charge-rent-house-8314.html on Aug. 11, 2016, 2 pages.
Miller et al., A Note on Leading Indicators of Housing Market Price Trends, vol. 1, No. 1, 1986.
Miller et al., Multiple Regression Condominium Valuation with a Touch of Behavioral Theory, The Appraisal Journal 1987.
Miller et al., Pricing Strategies and Residential Property Selling Prices, The Journal of Real Estate Research, vol. 2, No. 1, Nov. 1, 1987.
Miller et al., The Impact of Interest Rates and Employment on Nominal Housing Prices, International Real Estate Review, vol. 8 No. 1, pp. 26-42, 2005.
MRMLS Realist Tax System Foreclosure User Guide, crmls.org/help/realist_manuals/realist_foreclosure.pdf. Oct. 30, 2007.
Non-Final Office Action for U.S. Appl. No. 11/927,623, dated Jan. 11, 2016, 13 pages.
Non-Final Office Action for U.S. Appl. No. 13/044,480, dated Mar. 12, 2015, 32 pages.
Non-Final Office Action for U.S. Appl. No. 13/044,490, dated Jan. 14, 2016, 18 pages.
Non-Final Office Action for U.S. Appl. No. 13/828,680, dated Dec. 15, 2015, 42 pages.
Non-Final Office Action for U.S. Appl. No. 13/843,577, dated Sep. 24, 2015, 50 pages.
Non-Final Office Action for U.S. Appl. No. 12/924,037, dated Nov. 17, 2014, 13 pages.
Non-Final Office Action for U.S. Appl. No. 12/924,037, dated Jan. 10, 2013, 9 pages.
Non-Final Office Action for U.S. Appl. No. 12/924,037, dated May 27, 2014, 14 pages.
Non-Final Office Action for U.S. Appl. No. 13/044,480, dated Aug. 17, 2016, 40 pages.
Non-Final Office Action for U.S. Appl. No. 13/044,490, dated Jul. 22, 2016, 11 pages.
Non-Final Office Action for U.S. Appl. No. 14/041,450, dated Aug. 18, 2016, 48 pages.
Non-Final Office Action for U.S. Appl. No. 14/078,076, dated Aug. 14, 2015, 15 pages.
Notice of Allowance for U.S. Appl. No. 13/417,804, dated Aug. 18, 2016, 15 pages.
Preliminary Patent Owner Response for U.S. Pat. No. 7,970,674, Case No. IPR2013-00034, dated Feb. 15, 2013, 39 pages.
Quirk, B., "Zilpy.com launches a rental data website built in partnership with Zillow!!!", published Jan. 29, 2008, retrieved from http://www.propertymanagementmavens.com/archives/2008/1 on Aug. 11, 2016, 3 pages.
Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, pp. 1-4.
Second Office Action in Chinese Patent Application No. 200710306194.8, dated Apr. 1, 2010, 9 pages, english translation.
Wikipedia, Survival Analysis, <http://en.wikipedia.org/wiki/Survival_analysis> Oct. 16, 2011, Archived by Internet Wayback Machine <http://web.archive.org/web/20111016061152/http://!en.wikipedia.org/wiki/Survival_analysis>, viewed Aug. 28, 2015, pp. 1-5.
Zillow.com, Quarterly Report 2Q 2006, A Review of the San Francisco Real Estate Market.
U.S. Appl. No. 12/924,037 of Flint et al., filed Sep. 16, 2010.
U.S. Appl. No. 13/843,577 of Humphries et al., filed Mar. 15, 2013.
U.S. Appl. No. 14/078,076 of Daimler et al., filed Nov. 12, 2013.
U.S. Appl. No. 14/640,860 of Rao et al., filed Mar. 6, 2015.
U.S. Appl. No. 14/704,567 of Wang et al., filed May 5, 2015.
U.S. Appl. No. 14/709,719 of Humphries et al., filed May 12, 2015.
U.S. Appl. No. 14/721,437 of Humphries et al., filed May 26, 2015.
U.S. Appl. No. 15/439,388 of Bruce et al., filed Feb. 22, 2017.
U.S. Appl. No. 15/456,235 of VanderMey, filed Mar. 10, 2017.
U.S. Appl. No. 15/698,276 of Humphries, filed Sep. 7, 2017.
U.S. Appl. No. 15/715,098 of Moghimi, filed Sep. 25, 2017.
U.S. Appl. No. 15/789,617 of VanderMey, filed Oct. 20, 2017.
Beracha, E., et al., "The Rent versus Buy Decision: Investigating the Needed Property Appreciation Rates to be Indifferent between Renting and Buying Property." Journal of Real Estate Practice and Education, 15(2), 71-88.
Final Office Action for U.S. Appl. No. 12/924,037, dated Jul. 19, 2017, 25 pages.
Final Office Action for U.S. Appl. No. 14/078,076, dated Jul. 27, 2017, 32 pages.
Final Office Action for U.S. Appl. No. 11/927,623, dated Nov. 3, 2016, 15 pages.
Final Office Action for U.S. Appl. No. 13/044,480, dated Jun. 12, 2017, 55 pages.
Final Office Action for U.S. Appl. No. 13/044,490, dated Mar. 29, 2017, 7 pages.
Final Office Action for U.S. Appl. No. 13/830,497, dated Jun. 8, 2017, 57 pages.
Final Office Action for U.S. Appl. No. 13/843,577, dated Oct. 6, 2017, 83 pages.
Final Office Action for U.S. Appl. No. 14/041,450, dated Apr. 6, 2017, 47 pages.
Non-Final Office Action for U.S. Appl. No. 14/041,450, dated Nov. 16, 2017, 11 pages.
Non-Final Office Action for U.S. Appl. No. 14/704,567, dated Dec. 7, 2017, 19 pages.
Non-Final Office Action for U.S. Appl. No. 12/924,037, dated Jan. 10, 2018, 17 pages.
Non-Final Office Action for U.S. Appl. No. 13/044,490, dated Jan. 24, 2018, 8 pages.
Non-Final Office Action for U.S. Appl. No. 13/828,680, dated Nov. 16, 2017, 47 pages.
Non-Final Office Action for U.S. Appl. No. 13/830,497, dated Sep. 14, 2016, 52 pages.
Non-Final Office Action for U.S. Appl. No. 13/843,577, dated Dec. 19, 2016, 80 pages.
Non-Final Office Action for U.S. Appl. No. 14/078,076, dated Oct. 19, 2016, 29 pages.

(56) References Cited

OTHER PUBLICATIONS

Non-Final Office Action for U.S. Appl. No. 14/325,094, dated Oct. 31, 2017, 69 pages.
Non-Final Office Action for U.S. Appl. No. 14/524,148, dated Dec. 15, 2017, 27 pages.
Non-Final Office Action for U.S. Appl. No. 14/721,437, dated Dec. 18, 2017, 53 pages.
Non-Final Office Action for U.S. Appl. No. 14/846,632, dated Jan. 16, 2018, 9 pages.
Non-Final Office Action for U.S. Appl. No. 11/927,623, dated Oct. 6, 2017, 15 pages.
Non-Final Office Action for U.S. Appl. No. 12/924,037, dated Nov. 10, 2016, 19 pages.
Non-Final Office Action for U.S. Appl. No. 14/709,719, dated Jan. 31, 2018, 11 pages.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).
Gelfand, A.E. et al., "The Dynamics of Location in Home Price," J. Of Real Estate Fin. and Econ., vol. 29:2, 2004, pp149-166, accessible at https://link.springer.com/content/pdf/10.1023%/2FB%3AREAL.0000035308.15346.0a.pdf (accessed Feb. 26, 2018). (Year: 2004).
Non-Final Office Action for U.S. Appl. No. 11/927,623, dated Mar. 26, 2018, Examiner I.S. Kang, 15 pages.
Non-Final Office Action for U.S. Appl. No. 14/640,860, dated Mar. 7, 2018.
Non-Final Office Action for U.S. Appl. No. 13/830,497, dated Apr. 12, 2018.
Quercia, R.G. et al., "Spatio-Temporal Measurement of House Price Appreciation in Underserved Areas," J. of Housing Research, vol. 11, 2000, available at https://pdfs.semanticscholar.org/3a44/ddfbc508f61f8952d7e440c37cfdfaf441 ba.pdf (accessed Feb. 26, 2018). (Year: 2000).

* cited by examiner

FIG. 3

Henderson County recent sales table — 300

| id | address | sq. ft. | bedrooms | bathrooms | floors | view | year | selling price | date | |
|---|---|---|---|---|---|---|---|---|---|---|
| 1 | 111 Main St., Hendricks, IL 62012 | 1850 | 4 | | 2 | no | 1953 | $132,500 | 1/3/2005 | 301 |
| 2 | 96 Elm St., Hendricks, IL 62014 | 2220 | 6 | | 2 | no | 1965 | $201,000 | 1/8/2005 | 302 |
| 3 | 140 Cottontail Rd., Baron, IL 62019 | 1375 | 3 | | 1 | no | 1974 | $98,750 | 1/11/2005 | 303 |
| 4 | 6 Spratt Ln., Baron, IL 62019 | 1590 | 2 | | 2 | no | 1973 | $106,500 | 1/14/2005 | 304 |
| 5 | 776 Fir St., Hendricks, IL 62014 | 2280 | 3 | | 3 | yes | 1948 | $251,000 | 1/26/2005 | 305 |
| 6 | 111 Industry Ave., Fenton IL 62017 | 1950 | 2 | | 2 | no | 1925 | $240,000 | 2/4/2005 | 306 |
| 7 | 105 Elm St., Hendricks, IL 62014 | 2180 | 5 | | 2 | yes | 1940 | $230,000 | 2/4/2005 | 307 |
| 8 | 110 Muffet St., Baron, IL 62019 | 1675 | 4 | | 2 | no | 1975 | $74,900 | 2/14/2005 | 308 |
| 9 | 156 Elm St., Hendricks, IL 62014 | 2400 | 6 | | 3 | yes | 1938 | $253,500 | 2/15/2005 | 309 |
| 10 | 142 Cottontail Rd., Baron, IL 62019 | 1450 | 3 | | 1 | no | 1966 | $102,000 | 2/18/2005 | 310 |
| 11 | 160 Prospect Bldv., Fenton IL 62017 | 1952 | 4 | | 2 | no | 1920 | $230,000 | 2/20/2005 | 311 |
| 12 | 36 Spratt Ln., Baron, IL 62019 | 1475 | 4 | | 2 | no | 1964 | $111,000 | 2/20/2005 | 312 |
| 13 | 118 Main St., Hendricks, IL 62012 | 2140 | 5 | | 2 | no | 1935 | $211,000 | 2/21/2005 | 313 |
| 14 | 234 Cottontail Rd., Baron, IL 62019 | 1980 | 4 | | 3 | yes | 1930 | $197,900 | 2/24/2005 | 314 |
| 15 | 677 Fir St., Hendricks, IL 62014 | 2320 | 5 | | 3 | yes | 1927 | $238,000 | 2/28/2005 | 315 |
| 321 | 322 | 323 | 324 | 325 | 326 | 327 | 328 | 329 | 330 | |

| id | address | bedrooms | view | selling price |
|---|---|---|---|---|
| | | | | tree 1 basis table ╱— 500 |
| 2 | 96 Elm St., Hendricks, IL 62014 | 6 | no | $201,000 — 302 |
| 8 | 110 Muffet St., Baron, IL 62019 | 4 | no | $74,900 — 308 |
| 9 | 156 Elm St., Hendricks, IL 62014 | 6 | yes | $253,500 — 309 |
| 11 | 160 Prospect Bldv., Fenton IL 62017 | 4 | no | $230,000 — 311 |
| 13 | 118 Main St., Hendricks, IL 62012 | 5 | no | $211,000 — 313 |
| 15 | 677 Fir St., Hendricks, IL 62014 | 5 | yes | $238,000 — 315 |
| 321 | 322 | 324 | 327 | 329 |

*FIG. 5*

FIG. 9 tree 1 scoring table — 900

| id | address | bedrooms | view | selling price | valuation | error |
|---|---|---|---|---|---|---|
| 1 | 111 Main St., Hendricks, IL 62012 | 4 | no | $132,500 | $152,450 | 0.1506 |
| 3 | 140 Cottontail Rd., Baron, IL 62019 | 3 | no | $98,750 | $152,450 | 0.5438 |
| 4 | 6 Spratt Ln., Baron, IL 62019 | 2 | no | $106,500 | $152,450 | 0.4315 |
| 5 | 776 Fir St., Hendricks, IL 62014 | 3 | yes | $251,000 | $152,450 | 0.3926 |
| 6 | 111 Industry Ave., Fenton IL 62017 | 2 | no | $240,000 | $152,450 | 0.3648 |
| 7 | 105 Elm St., Hendricks, IL 62014 | 5 | yes | $230,000 | $245,750 | 0.0685 |
| 10 | 142 Cottontail Rd., Baron, IL 62019 | 3 | no | $102,000 | $152,450 | 0.4946 |
| 12 | 36 Spratt Ln., Baron, IL 62019 | 4 | no | $111,000 | $152,450 | 0.3734 |
| 14 | 234 Cottontail Rd., Baron, IL 62019 | 4 | yes | $197,900 | $152,450 | 0.2297 | median err. 0.3734

US 10,074,111 B2

AUTOMATICALLY DETERMINING A CURRENT VALUE FOR A HOME

CROSS-REFERENCE TO RELATED APPLICATION(S)

This application is a continuation of U.S. patent application Ser. No. 11/347,000, entitled "AUTOMATICALLY DETERMINING A CURRENT VALUE FOR A HOME" which was filed on Feb. 3, 2006, which is incorporated herein in its entirety by reference.

TECHNICAL FIELD

The described technology is directed to the field of electronic commerce techniques, and, more particularly, to the field of electronic commerce techniques relating to real estate.

BACKGROUND

In many roles, it can be useful to be able to accurately determine the value of residential real estate properties ("homes"). As examples, by using accurate values for homes: taxing bodies can equitably set property tax levels; sellers and their agents can optimally set listing prices; buyers and their agents can determine appropriate offer amounts; insurance firms can properly value their insured assets; and mortgage companies can properly determine the value of the assets securing their loans.

A variety of conventional approaches exist for valuing houses. Perhaps the most reliable is, for a house that was very recently sold, attributing its selling price as its value. Unfortunately, following the sale of a house, its current value can quickly diverge from its sale price. Accordingly, the sale price approach to valuing a house tends to be accurate for only a short period after the sale occurs. For that reason, at any given time, only a small percentage of houses can be accurately valued using the sale price approach.

Another widely-used conventional approach to valuing houses is appraisal, where a professional appraiser determines a value for a house by comparing some of its attributes to the attributes of similar nearby homes that have recently sold ("comps"). The appraiser arrives at an appraised value by subjectively adjusting the sale prices of the comps to reflect differences between the attributes of the comps and the attributes of the house being appraised. The accuracy of the appraisal approach can be adversely affected by the subjectivity involved. Also, appraisals can be expensive, can take days or weeks to completed, and may require physical access to the house by the appraiser.

In view of the shortcomings of conventional approaches to valuing houses discussed above, a new approach to valuing houses that was more universally accurate, less expensive, and more convenient would have significant utility.

BRIEF DESCRIPTION OF THE DRAWINGS

FIG. 3 is a table diagram showing sample contents of a recent sales table.

FIG. 5 is a table diagram showing sample contents of a basis table containing the basis information selected for the tree.

FIG. 9 is a table diagram showing sample results for scoring a tree.

DETAILED DESCRIPTION

Figure 1:
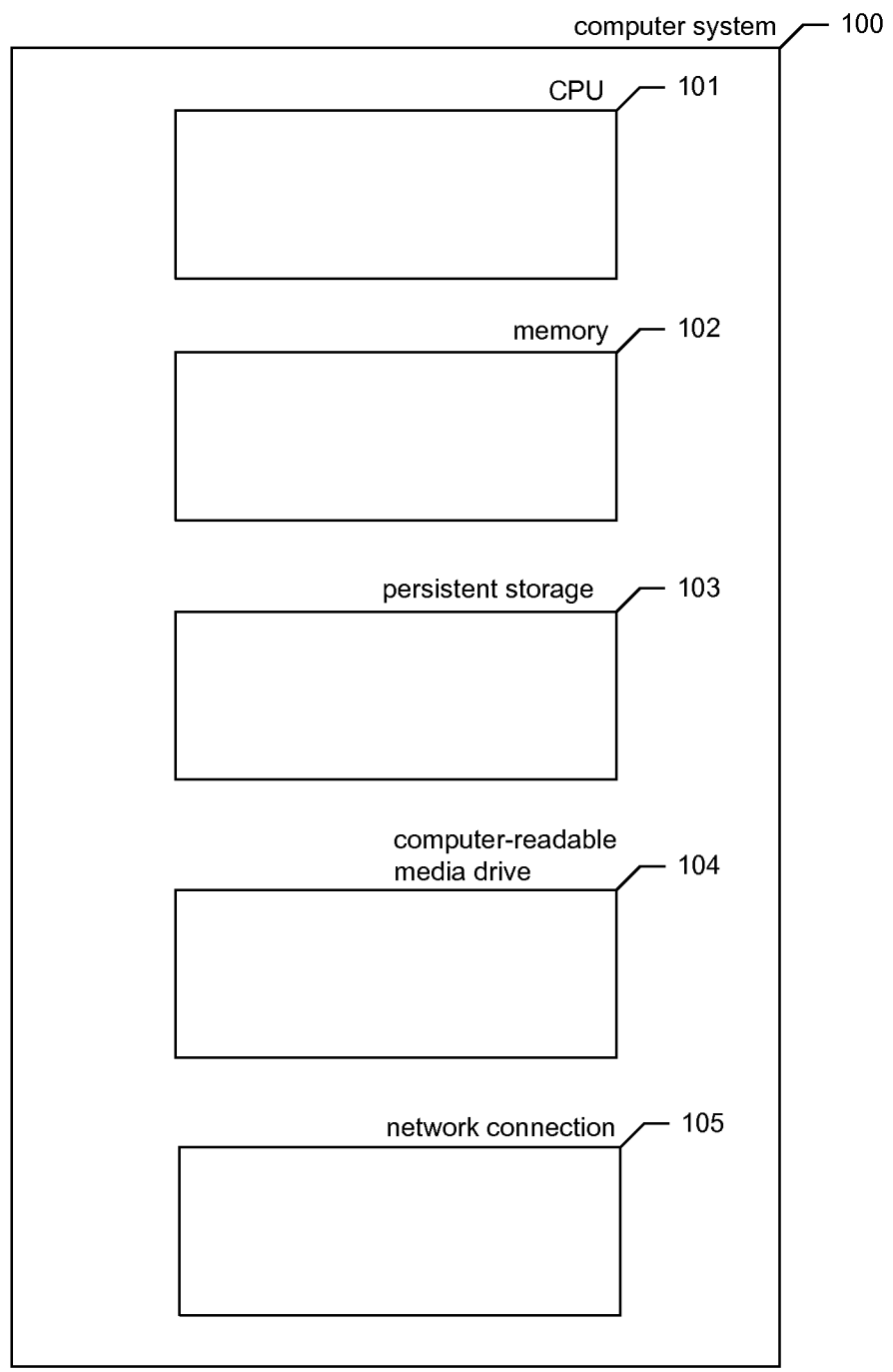
FIG. 1 is a block diagram showing some of the components typically incorporated in at least some of the computer systems and other devices on which the facility executes.

A software facility for automatically determining a current value for a home ("the facility") is described. In some embodiments, the facility establishes, for each of a number of geographic regions, a model of housing prices in that region. This model transforms inputs corresponding to home attributes into an output constituting a predicted current value of a home in the corresponding geographic area having those attributes. In order to determine the current value of a particular home, the facility selects the model for a geographic region containing the home, and subjects the home's attributes to the selected model.

In some embodiments, the facility constructs and/or applies housing price models each constituting a forest of classification trees. In some such embodiments, the facility uses a data table that identifies, for each of a number of homes recently sold in the geographic region to which the forest corresponds, attributes of the home and its selling price. For each of the trees comprising the forest, the facility randomly selects a fraction of homes identified in the table, as well as a fraction of the attributes identified in the table. The facility uses the selected attributes of the selected homes, together with the selling prices of the selected homes, to construct a classification tree in which each non-leaf node represents a basis for differentiating selected homes based upon one of the selected attributes. For example, where number of bedrooms is a selected attribute, a non-leaf node may represent the test "number of bedrooms ≤4." This node defines 2 subtrees in the tree: one representing the selected homes having 4 or fewer bedrooms, the other representing the selected homes having 5 or more bedrooms. Each leaf node of the tree represents all of the selected homes having attributes matching the ranges of attribute values corresponding to the path from the tree's root node to the leaf node. The facility assigns each leaf node a value corresponding to the mean of the selling prices of the selected homes represented by the leaf node.

In some areas of the country, home selling prices are not public records, and may be difficult or impossible to obtain. Accordingly, in some embodiments, the facility estimates the selling price of a home in such an area based upon loan values associated with its sale and an estimated loan-to-value ratio.

In order to weight the trees of the forest, the facility further scores the usefulness of each tree by applying the tree to homes in the table other than the homes that were selected to construct the tree, and, for each such home, comparing the value indicated for the home by the classification tree (i.e., the value of the leaf node into which the tree classifies the home) to its selling price. The closer the values indicated by the tree to the selling prices, the higher the score for the tree.

In most cases, it is possible to determine the attributes of a home to be valued. For example, they can often be obtained from existing tax or sales records maintained by local governments. Alternatively, a home's attributes may be inputted by a person familiar with them, such as the owner, a listing agent, or a person that derives the information from the owner or listing agent. In order to determine a value for a home whose attributes are known, the facility applies all of the trees of the forest to the home, so that each tree indicates a value for the home. The facility then calculates an average of these values, each weighted by the score for its tree, to obtain a value for the home. In various embodiments, the facility presents this value to the owner of the home, a prospective buyer of the home, a real estate agent, or another person interested in the value of the home or the value of a group of homes including the home.

In some embodiments, the facility applies its model to the attributes of a large percentage of homes in a geographic area to obtain and convey an average home value for the homes in that area. In some embodiments, the facility periodically determines an average home value for the homes in a geographic area, and uses them as a basis for determining and conveying a home value index for the geographic area.

Because the approach employed by the facility to determine the value of a home does not rely on the home having recently been sold, it can be used to accurately value virtually any home whose attributes are known or can be determined. Further, because this approach does not require the services of a professional appraiser, it can typically determine a home's value quickly and inexpensively, in a manner generally free from subjective bias.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data including data structures, database tables, other data tables, etc. while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

Figure 2:
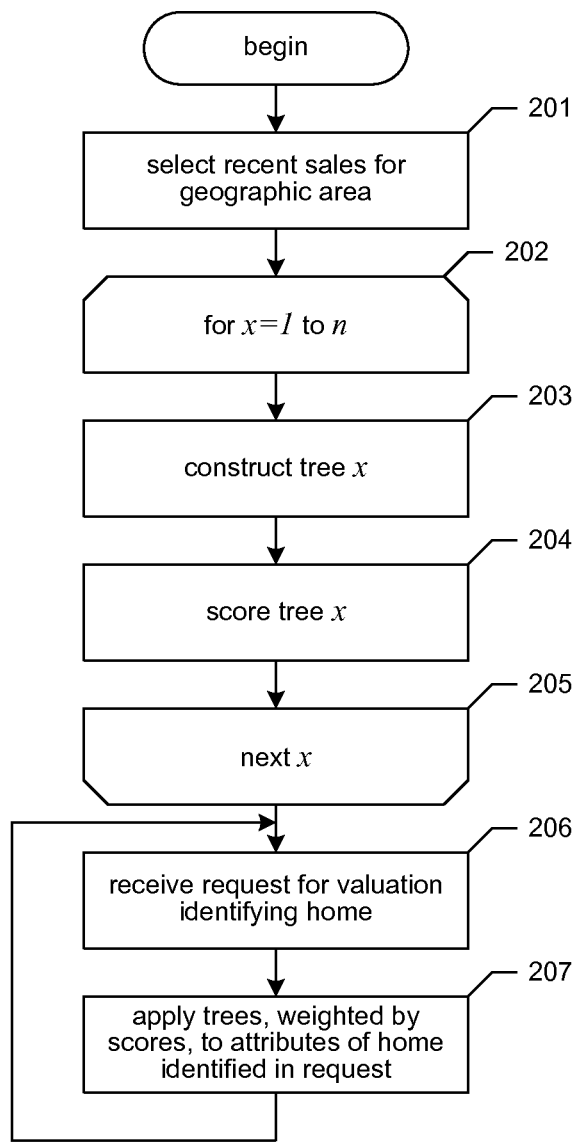
FIG. 2 is a flow diagram showing steps typically performed by the facility to automatically determine current values for homes in a geographic area.

FIG. 2 is a flow diagram showing steps typically performed by the facility to automatically determine current values for homes in a geographic area. The facility may perform these steps for one or more geographic areas of one or more different granularities, including neighborhood, city, county, state, country, etc. These steps may be performed periodically for each geographic area, such as daily. In step 201, the facility selects recent sales occurring in the geographic area. The facility may use sales data obtained from a variety of public or private sources.

FIG. 3 is a table diagram showing sample contents of a recent sales table. The recent sales table 300 is made up of rows 301-315, each representing a home sale that occurred in a recent period of time, such as the preceding 60 days. Each row is divided into the following columns: an identifier column 321 containing an identifier for the sale; an address column 322 containing the address of the sold home; a square foot column 323 containing the floor area of the home; a bedrooms column 324 containing the number of bedrooms in the home; a bathrooms column 325 containing the number of bathrooms in the home; a floors column 326 containing the number of floors in the home; a view column 327 indicating whether the home has a view; a year column 328 showing the year in which the house was constructed; a selling price column 329 containing the selling price at which the home was sold; and a date column 330 showing the date on which the home was sold. For example, row 301 indicates that sale number 1 of the home at 111 Main St., Hendricks, Ill. 62012 having a floor area of 1850 square feet, 4 bedrooms, 2 bathrooms, 2 floors, no view, built in 1953, was for $132,500, and occurred on Jan. 3, 2005. While the contents of recent sales table 300 were included to pose a comprehensible example, those skilled in the art will appreciate that the facility can use a recent sales table having columns corresponding to different and/or a larger number of attributes, as well as a larger number of rows. Attributes that may be used include, for example, construction materials, cooling technology, structure type, fireplace type, parking structure, driveway, heating technology, swimming pool type, roofing material, occupancy type, home design type, view type, view quality, lot size and dimensions, number of rooms, number of stories, school district, longitude and latitude, neighborhood or subdivision, tax assessment, attic and other storage, etc. For a variety of reasons, certain values may be omitted from the recent sales table. In some embodiments, the facility imputes missing values using the median value in the same column for continuous variables, or the mode (i.e., most frequent) value for categorical values.

While FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 2, in steps 202-205, the facility constructs and scores a number of trees, such as 100. This number is configurable, with larger numbers typically yielding better results but requiring the application of greater computing resources. In step 203, the facility constructs a tree. In some embodiments, the facility constructs and applies random forest valuation models using an R mathematical software package available at http://cran.r-project.org/ and described at http://www.maths.lth.se/help/R/.R/library/randomForest/html/randomForest.html. Step 203 is discussed in greater detail below in connection with FIG. 4. In step 204, the facility scores the tree constructed in step 203. Step 204 is discussed in greater detail below in connection with FIG. 8.

In steps 206-207, the facility uses the forest of trees constructed and scored in steps 202-205 to process requests for home valuations. Such requests may be individually issued by users, or issued by a program, such as a program that automatically requests valuations for all homes in the geographic area at a standard frequency, such as daily, or a program that requests valuations for all of the homes occurring on a particular map in response to a request from a user to retrieve the map. In step 206, the facility receives a request for valuation identifying the home to be valued. In step 207, the facility applies the trees constructed in step 203, weighted by the scores generated for them in step 204, to the attributes in the home identified in the received request in order to obtain a valuation for the home identified in the request. After step 207, the facility continues in step 206 to receive the next request.

Those skilled in the art will appreciate that the steps shown in FIG. 2 and in each of the flow diagrams discussed below may be altered in a variety of ways. For example, the order of the steps may be rearranged; substeps may be performed in parallel; shown steps may be omitted, or other steps may be included; etc.

Figure 4A:
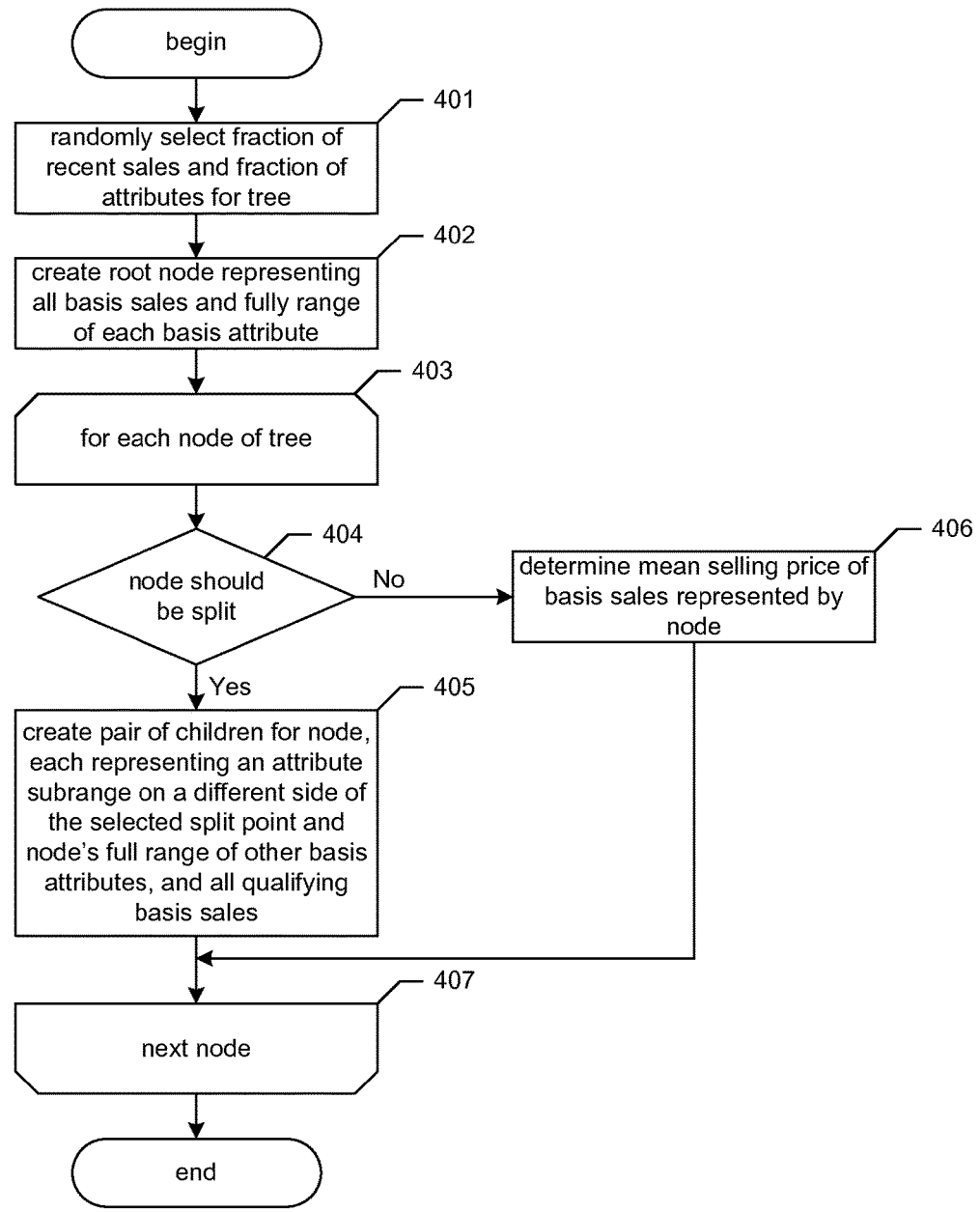
FIG. 4A is a flow diagram showing steps typically performed by the facility in order to construct a tree.

FIG. 4A is a flow diagram showing steps typically performed by the facility in order to construct a tree. In step 401, the facility randomly selects a fraction of the recent sales in the geographic area to which the tree corresponds, as well as a fraction of the available attributes, as a basis for the tree.

FIG. 5 is a table diagram showing sample contents of a basis table containing the basis information selected for the tree. Basis table 500 contains rows randomly selected from the recent sales table 300, here rows 302, 308, 209, 311, 313, and 315. The basis table further includes the identifier column 321, address column 322, and selling price column 329 from the recent sales table, as well as randomly selected columns for two available attributes: a bedrooms column 324 and a view column 327. In various embodiments, the facility selects various fractions of the rows and attribute columns of the recent sales table for inclusion in the basis table; here, the fraction one third is used for both.

In some embodiments, the facility filters rows from the basis table having selling prices that reflect particularly rapid appreciation or depreciation of the home relative to its immediately-preceding selling price. For example, in some embodiments, the facility filters from the basis table recent sales whose selling prices represent more than 50% annual appreciation or more than 50% annual depreciation. In other embodiments, however, the facility initially performs the filtering described above, then uses the filtered basis table to construct a preliminary model, applies the preliminary model to the unfiltered basis table, and excludes from the basis table used to construct the primary model those sales where the valuation produced by the preliminary model is either more than 2 times the actual selling price or less than one-half of the actual selling price.

Returning to FIG. 4A, in step 402, the facility creates a root node for the tree that represents all of the basis sales contained in the basis table and the full range of each of the basis attributes.

Figure 6:
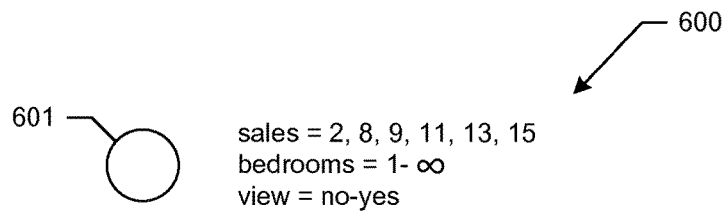
FIG. 6 is a tree diagram showing a root node corresponding to the basis table 500.

FIG. 6 is a tree diagram showing a root node corresponding to the basis table 500. The root node 601 represents the sales having identifiers 2, 8, 9, 11, 13, and 15; values of the bedrooms attribute between 1-∞; and values of the view attribute of yes and no.

Figure 4B:
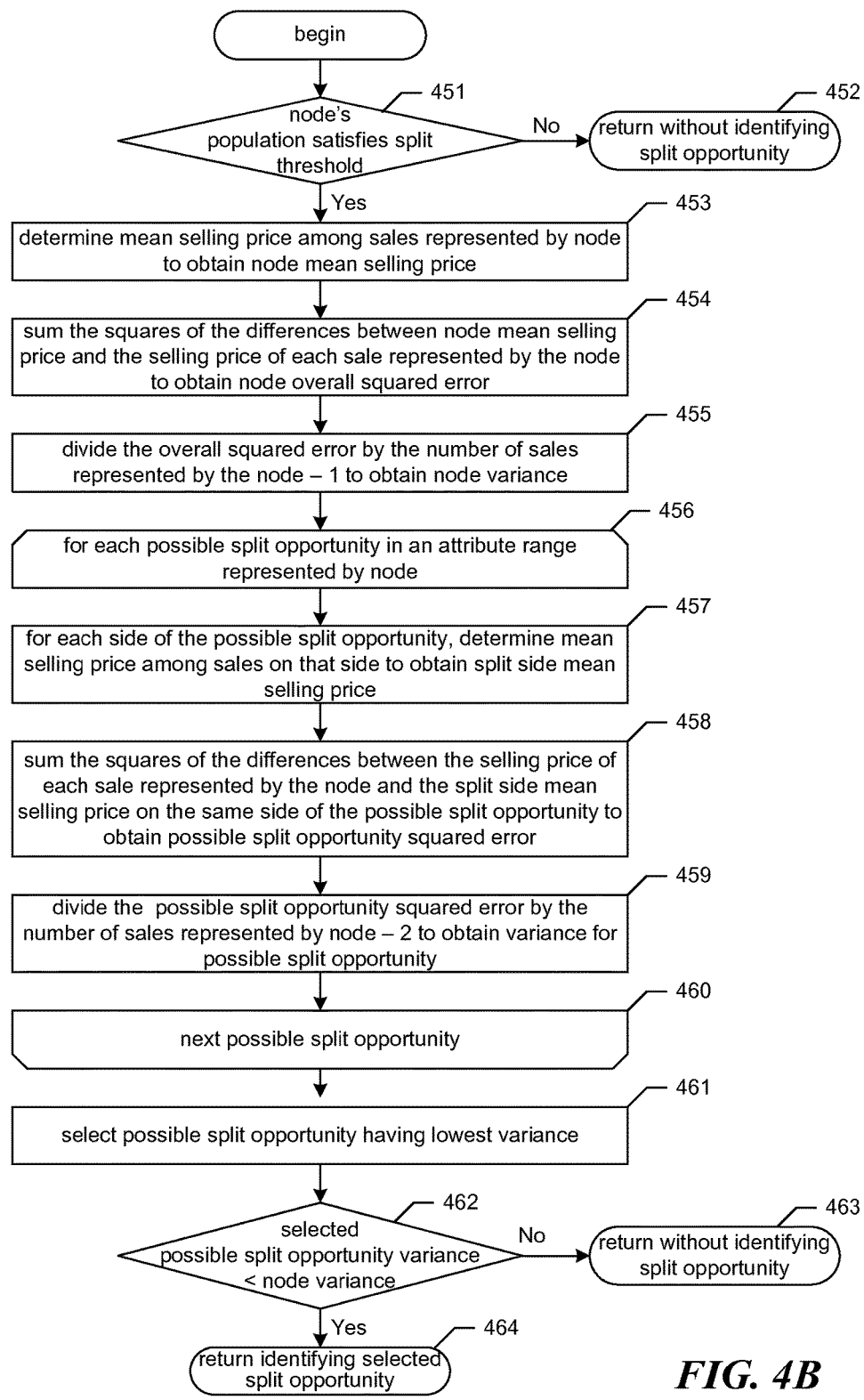
FIG. 4B is a flow diagram showing steps typically performed by the facility in order to determine whether and how to split a node of a tree.

Returning to FIG. 4A, in steps 403-407, the facility loops through each node of the tree, including both the root node created in step 402 and any additional nodes added to the tree in step 405. In step 404, if it is possible to "split" the node, i.e., create two children of the node each representing a different subrange of an attribute value range represented by the node, then the facility continues in step 405, else the facility continues in step 406. FIG. 4B is a flow diagram showing steps typically performed by the facility in order to determine whether and how to split a node of a tree. These steps generally identify a potential split opportunity having the highest information gain, and determine whether the information gain of that potential split opportunity exceeds the information gain of the current node. In step 451, the facility determines whether the node's population that is, the number of basis sales represented by the node satisfies a split threshold, such as a split threshold that requires more than three basis sales. If the threshold is not satisfied, then the facility returns to step 404 in step 452 without identifying any split opportunity, such that the facility will not split the node; otherwise, the facility continues in step 453. Though not shown, the facility may apply a variety of other tests to determine whether the node should be split, including whether any of the selected attribute ranges represented by the node is divisible. For example, where the selected attributes are bedrooms and view, and a node represents the ranges bedrooms=5 and view=no, none of the node's selected attribute ranges can be split.

In steps 453-455, the facility analyzes the characteristics of the node in order to be able to compare them to characteristics of pairs of possible child nodes that would result from different opportunities for splitting the node. In step 453, the facility determines the mean selling price among the sales represented by the node to obtain a node mean selling price for the node. Applying step 453 to root node 600 shown in FIG. 6, the facility determines a mean selling price for the node as shown below in Table 1 by determining the mean of all the selling prices shown in basis table 500.

TABLE 1

| 1 | Node mean selling price = | $201,400 |
|---|---|---|

In step 454, the facility sums the squares of the differences between the node mean selling price determined in step 454 and the selling price of each sale represented by the node to obtain a node overall squared error. This calculation is shown below in table 2 for root node 601.

TABLE 2

| 2 | Sale 2 overall squared error = ($201,000 − line 1)² = | 160000 |
|---|---|---|
| 3 | Sale 8 overall squared error = ($74,900 − line 1)² = | 16002250000 |
| 4 | Sale 9 overall squared error = ($253,500 − line 1)² = | 2714410000 |
| 5 | Sale 11 overall squared error = ($230,000 − line 1)² = | 817960000 |
| 6 | Sale 13 overall squared error = ($211,000 − line 1)² = | 92160000 |
| 7 | Sale 15 overall squared error = ($238,000 − line 1)² = | 1339560000 |
| 8 | Node overall squared error = | 20966500000 |

In step 455, the facility divides the overall squared error by one fewer than the number of sales represented by the node in order to obtain a node variance. The calculation of step 455 for root node 600 is shown below in table 3.

TABLE 3

| 9 | Node variance = line 8/5 = | 4193300000 |
|---|---|---|

In steps 456-460, the facility analyzes the characteristics of each possible split opportunity that exists in the node; that is, for each attribute range represented by the node, any point at which that range could be divided. For root node 600, three such split opportunities exist: (1) view=no/view=yes; (2) bedrooms≤4/bedrooms>4; and (3) bedrooms≤5/bedrooms>5. In step 457, for each side of the possible split opportunity, the facility determines the mean selling price among sales on that side to obtain a split side mean selling price. Table 4 below shows the performance of this calculation for both sides of each of the three possible split opportunities of root node 600.

TABLE 4

| 10 | Split side mean selling price of view = no side of possible split opportunity 1 = mean of selling prices for sales 2, 8, 11, and 13 = | $179,225 |
|---|---|---|
| 11 | Split side mean selling price of view = yes side of possible split opportunity 1 = mean of selling prices for sales 9 and 15 = | $245,750 |
| 12 | Split side mean selling price for bedrooms ≤4 side of possible split opportunity 2 = mean of selling prices of sales 8 and 11 = | $152,450 |
| 13 | Split side mean selling price for bedrooms >4 side of possible split opportunity 2 = mean of selling prices of sales 2, 9, 13, and 15 = | $225,875 |
| 14 | Split side mean selling price for bedrooms ≤5 side of possible split opportunity 3 = mean of selling prices of sales 8, 11, 13, and 15 = | $188,475 |
| 15 | Split side mean selling price for bedrooms >5 side of possible split opportunity 3 = mean of selling prices of sales 2 and 9 = | $227,250 |

In step 458, the facility sums the squares of the differences between the selling price of each sale represented by the node and the split side mean selling price on the same side of the possible split opportunity to obtain a possible split opportunity squared error. The result of the calculation of step 458 for root node 600 is shown below in table 5.

TABLE 5

| 16 | Possible split opportunity 1 squared error for sale 2 = ($201,000 − line 10)² = | 474150625 |
|---|---|---|
| 17 | Possible split opportunity 1 squared error for sale 8 = ($74,900 − line 10)² = | 10883705625 |
| 18 | Possible split opportunity 1 squared error for sale 9 = ($253,500 − line 11)² = | 60062500 |
| 19 | Possible split opportunity 1 squared error for sale 11 = ($230,000 − line 10)² = | 2578100625 |
| 20 | Possible split opportunity 1 squared error for sale 13 = ($211,000 − line 10)² = | 1009650625 |
| 21 | Possible split opportunity 1 squared error for sale 15 = ($238,000 − line 11)² = | 60062500 |
| 22 | Possible split opportunity 1 squared error = sum of lines 16-21 = | 15065732500 |
| 23 | Possible split opportunity 2 squared error for sale 2 = ($201,000 − line 13)² = | 618765625 |
| 24 | Possible split opportunity 2 squared error for sale 8 = ($74,900 − line 12)² = | 6014002500 |
| 25 | Possible split opportunity 2 squared error for sale 9 = ($253,500 − line 13)² = | 763140625 |
| 26 | Possible split opportunity 2 squared error for sale 11 = ($230,000 − line 12)² = | 6014002500 |
| 27 | Possible split opportunity 2 squared error for sale 13 = ($211,000 − line 13)² = | 221265625 |

TABLE 5-continued

| 28 | Possible split opportunity 2 squared error for sale 15 = ($238,000 − line 13)² = | 147015625 |
|---|---|---|
| 29 | Possible split opportunity 2 squared error = sum of lines 23-28 = | 13778192500 |
| 30 | Possible split opportunity 3 squared error for sale 2 = ($201,000 − line 15)² = | 689062500 |
| 31 | Possible split opportunity 3 squared error for sale 8 = ($74,900 − line 14)² = | 12899280625 |
| 32 | Possible split opportunity 3 squared error for sale 9 = ($253,500 − line 15)² = | 689062500 |
| 33 | Possible split opportunity 3 squared error for sale 11 = ($230,000 − line 14)² = | 1724325625 |
| 34 | Possible split opportunity 3 squared error for sale 13 = ($211,000 − line 14)² = | 507375625 |
| 35 | Possible split opportunity 3 squared error for sale 15 = ($238,000 − line 14)² = | 2452725625 |
| 36 | Possible split opportunity 3 squared error = sum of lines 30-35 = | 18961832500 |

In line 459, the facility divides the possible split opportunity squared error by two less than the number of sales represented by the node to obtain a variance for the possible split opportunity. The calculation of step 459 is shown below for the three possible split opportunities of root node 600.

TABLE 6

| 37 | Variance for possible split opportunity 1 = line 22/4 = | 3766433125 |
|---|---|---|
| 38 | Variance for possible split opportunity 2 = line 29/4 = | 3444548125 |
| 39 | Variance for possible split opportunity 3 = line 36/4 = | 4740458125 |

In step 460, if another possible split opportunity remains to be processed, then the facility continues in step 456 to process the next possible split opportunity, else the facility continues in step 461.

In step 461, the facility selects the possible split opportunity having the lowest variance. In the example, the facility compares lines 37, 38 and 39 to identify the possible split opportunity 2 as having the lowest variance. In step 462, if the selected possible split opportunity variance determined in step 461 is less than the node variance determined in step 455, then the facility continues in step 464 to return, identifying the split opportunity selected in step 461, else the facility continues in step 463 to return without identifying a split opportunity. In the example, the facility compares line 38 to line 9, and accordingly determines to split the root node in accordance with split opportunity 2.

Returning to FIG. 4A, in step 405, where the steps shown in FIG. 4B determine that the node should be split, the facility creates a pair of children for the node. Each child represents one of the subranges of the split opportunity identified in step 404 and the node's full range of unselected attributes. Each child represents all basis sales whose attributes satisfy the attribute ranges represented by the child. Step 405 is discussed in greater detail below in connection with FIG. 7.

In step 406, because the node will be a leaf node, the facility determines the mean selling price of basis sales represented by the node.

In step 407, the facility processes the next node of the tree. After step 407, these steps conclude.

Figure 7:
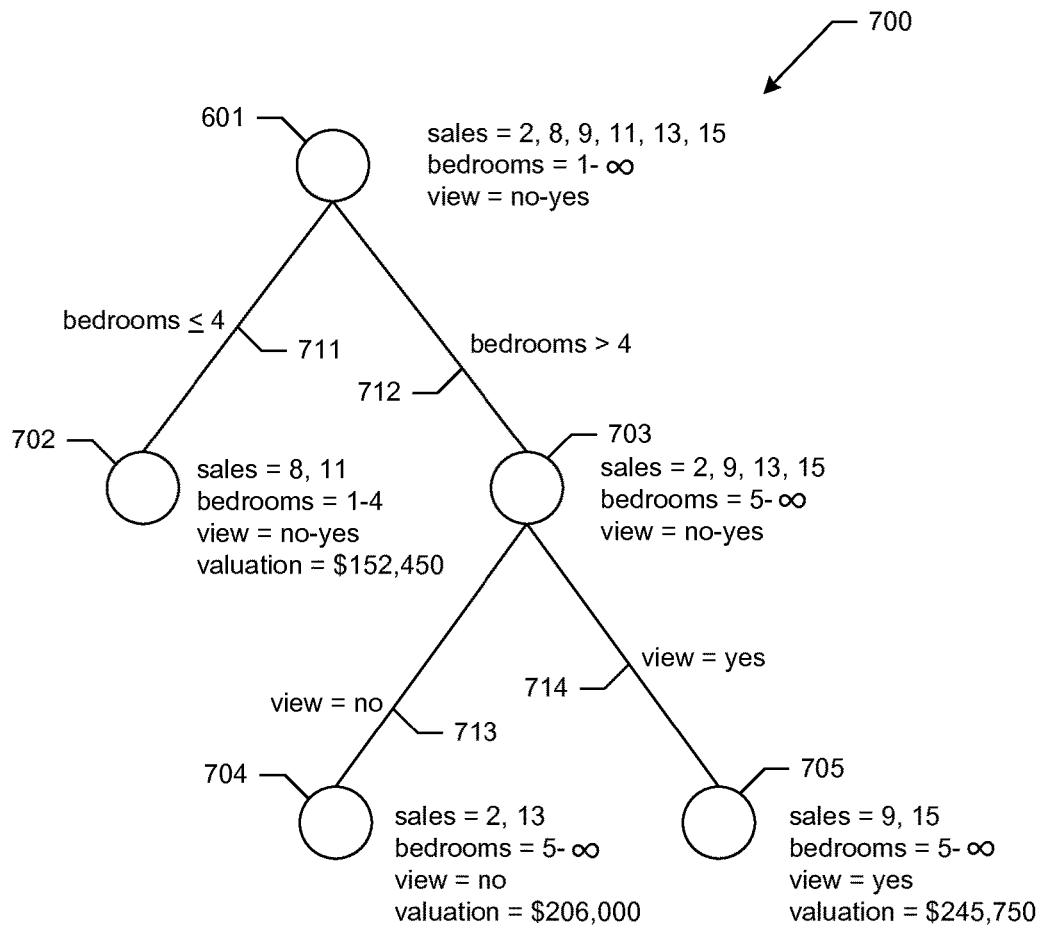
FIG. 7 is a tree diagram showing a completed version of the sample tree.

FIG. 7 is a tree diagram showing a completed version of the sample tree. It can be seen that the facility added child nodes 702 and 703 to root node 601, corresponding to the subranges defined by the split opportunity selected in step 461. Node 702 represents sales whose bedrooms attribute is less than or equal to 4, that is, between 1 and 4, as well as the full range of view attribute values represented by node 601. Accordingly, node 702 represents sales 8 and 11. Because this number of sales is below the threshold of 4, node 702 qualifies as a leaf node, and its valuation of $152,450 is calculated by determining the mean selling price of sales 8 and 11.

Node 703 represents sales with bedrooms attribute values greater than 4, that is, 5-∞. Node 703 further represents the full range of view attributes values for node 601. Accordingly, node 703 represents sales 2, 9, 13, and 15. Because this number of sales is not smaller than the threshold number and the node's ranges are not indivisible, the facility proceeded to consider possible split opportunities. In order to do so, the facility performs the calculation shown below in Table 7. For the following two possible split opportunities: (4) view=no/view=yes; and (5) bedrooms=5/bedrooms>5.

TABLE 7

| 40 | node mean selling price = mean of selling prices for sales 2, 9, 13, and 15 = | $ 225,875 |
|---|---|---|
| 41 | sale 2 overall squared error = ($201,000 − line 40)² = | 618765625 |
| 42 | sale 9 overall squared error = ($253,500 − line 40)² = | 76314625 |
| 43 | sale 13 overall squared error = ($211,000 − line 40)² = | 221265625 |
| 44 | sale 15 overall squared error = ($238,000 − line 40)² = | 147015625 |
| 45 | node overall squared error = | 1750187500 |
| 46 | node variance = line 45/3 = | 583395833 |
| 47 | split side mean selling price of view = no side of possible split opportunity 4 = mean selling prices of sales 2 and 13 = | $ 206,000 |
| 48 | split side mean selling price of view = yes side of possible split opportunity 4 = mean selling prices of sales 9 and 15 = | $ 245,750 |
| 49 | split side mean selling price for bedrooms ≤5 side of possible split opportunity 5 = mean selling prices of sales 13 and 15 = | $ 224,500 |
| 50 | split side mean selling price of bedrooms >5 side of possible split opportunity 5 = mean selling prices of sales 2 and 9 = | $ 227,250 |
| 51 | possible split opportunity 4 squared error for sale 2 = ($201,000 − line 47)² = | 25000000 |
| 52 | possible split opportunity 4 squared error for sale 9 = ($253,500 − line 48)² = | 60062500 |
| 53 | possible split opportunity 4 squared error for sale 13 = ($211,000 − line 47)² = | 25000000 |
| 54 | possible split opportunity 4 squared error for sale 15 = ($238,000 − line 48)² = | 60062500 |
| 55 | possible split opportunity 4 squared error = sum of lines 51-54 = | 17012500 |
| 56 | possible split opportunity 5 squared error for sale 2 = ($201,000 − line 50)² = | 689062500 |
| 57 | possible split opportunity 5 squared error for sale 9 = ($253,500 − line 50)² = | 689062500 |
| 58 | possible split opportunity 5 squared error for sale 13 = ($211,000 − line 49)² = | 182250000 |
| 59 | possible split opportunity 5 squared error for sale 15 = ($238,000 − line 49)² = | 182250000 |
| 60 | possible split opportunity 5 squared error = sum of lines 56-59 = | 1742625000 |
| 61 | variance for possible split opportunity 4 = line 55/2 = | 85062500 |
| 62 | variance for possible split opportunity 5 = line 60/2 = | 871312500 |

From Table 7, it can be seen that, between split opportunities 4 and 5, split opportunity 4 has the smaller variance, shown on line 61. It can further be seen that the variance of possible split opportunity 4 shown on line 61 is smaller than the node variance shown on line 46. Accordingly, the facility uses possible split opportunity 4 to split node 703, creating child nodes 704 and 705. Child node 704 represents basis sales 2 and 13, and that attribute ranges bedrooms=5-∞ and view=no. Node 704 has a valuation of $206,000, obtained by averaging the selling prices of the base of sales 2 and 13. Node 705 represents base of sales 9 and 15, and attribute value ranges bedrooms=5-∞ and view=yes. Node 705 has valuation $245,750, obtained by averaging the selling price of sales 9 and 15.

In order to apply the completed tree 700 shown in FIG. 7 to obtain its valuation for a particular home, the facility retrieves that home's attributes. As an example, consider a home having attribute values bedrooms=5 and view=yes. The facility begins at root node 601, and among edges 711 and 712, traverses the one whose condition is satisfied by the attributes of the home. In the example, because the value of the bedroom's attribute for the home is 5, the facility traverses edge 712 to node 703. In order to proceed from node 703, the facility determines, among edges 713 and 714, which edge's condition is satisfied. Because the home's value of the view attribute is yes, the facility traverses edge 714 to leaf node 705, and obtains a valuation for the sample home of $245,750.

Those skilled in the art will appreciate that the tree shown in FIG. 7 may not be representative in all respects of trees constructed by the facility. For example, such trees may have a larger number of nodes, and/or a larger depth. Also, though not shown in this tree, a single attribute may be split multiple times, i.e., in multiple levels of the tree.

Figure 8:
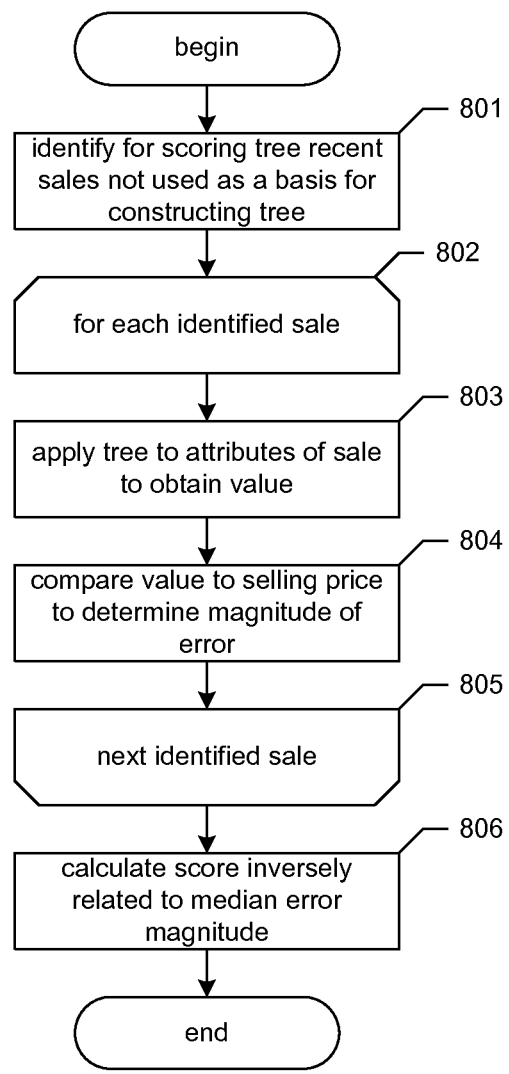
FIG. 8 shows steps typically performed by the facility in order to score a tree.

FIG. 8 shows steps typically performed by the facility in order to score a tree. In step 801, the facility identifies recent sales in the geographic area that were not used as a basis for constructing the tree in order to score the tree. In steps 802-805, the facility loops through each sale identified in step 801. In step 803, the facility applies the tree to the attributes of the sale to obtain a value. In step 804, the facility compares the value obtained in step 803 to the selling price for the sale to determine an error magnitude, dividing the difference between valuation and selling price by selling price. In step 806, the facility calculates a score that is inversely related to the median error magnitude determined in step 804. After step 806, these steps conclude.

FIG. 9 is a table diagram showing sample results for scoring a tree. Scoring table 900 scores tree 700 based upon the contents of recent sales table 300. The scoring table is made up of the rows of recent sales table 300 other than those used as basis sales for constructing the tree, i.e., rows 301, 303, 304, 305, 306, 307, 310, 312, and 314. It further contains the following columns from recent sales table 300: identifier column 321, address column 322, bedroom column 324, view column 327, and selling price column 329. The scoring table further contains a valuation column 911 containing the valuation of each home determined in step 803. For example, row 307 shows that the facility determines the valuation of $245,750 for sale 7 using tree 700. In particular, the facility begins at root node 601; traverses to node 703 because the number of bedrooms 5 is greater than 4; traverses to node 705 because view=yes; and adopts the valuation of node 705, $245,750. Scoring table 900 further contains an error column 912 indicating the difference between each home's valuation and selling price. For example, row 307 contains an error of 0.0685, the difference between valuation $245,750 and selling price $230,000, divided by selling price $230,000. Associated with the table is a median error field 951 containing the median of error values in the scoring table, or 0.3734. Each tree's median error value is used to determine weightings for the trees that are inversely related to their median error values. In some embodiments, the facility determines the particular tree's weighting by generating an accuracy metric for each tree by subtracting its median error value from 1, and dividing the tree's accuracy measure by the sum of all of the trees' accuracy measures. Also, a variety of different approaches to determine a score that is negatively correlated with the average error may be used by the facility.

When a home is valued using the forest, the sample tree will be applied to the attributes of the home in the same way it was applied to homes in the scoring process described above. (If any attributes of the home are missing, the facility typically imputes a value for the missing attribute based upon the median or mode for that attribute in the recent sales table.) The valuation produced will be averaged with the valuations produced by the other trees of the forest. In the average, each valuation will be weighted by the score attributed by the facility to the tree. This resultant average is presented as the valuation for the home.

Figure 10:
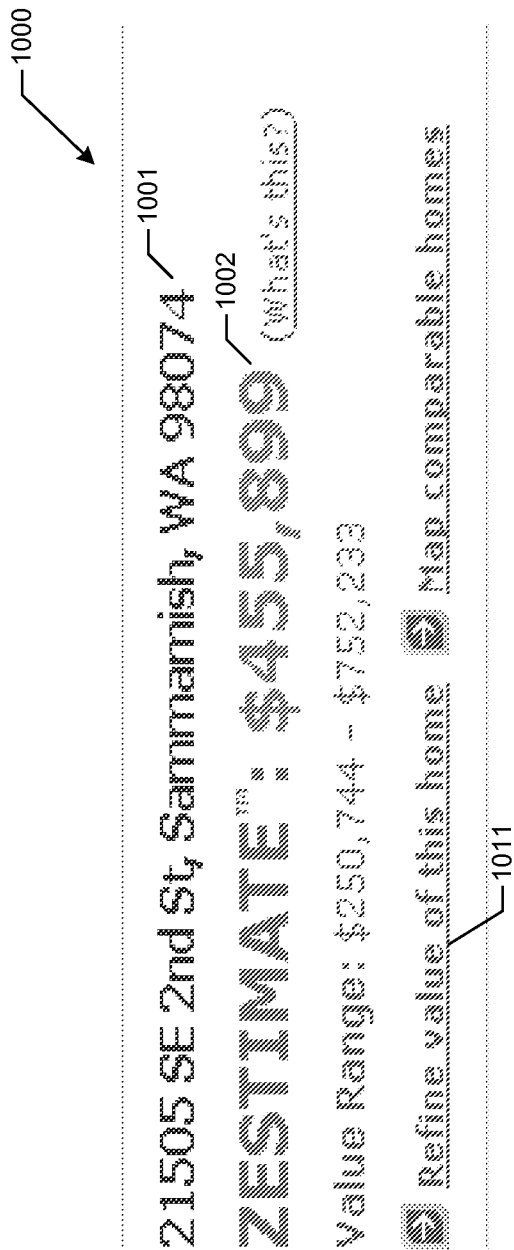
FIG. 10 is a display diagram showing detailed information about an individual home.
Figure 11:
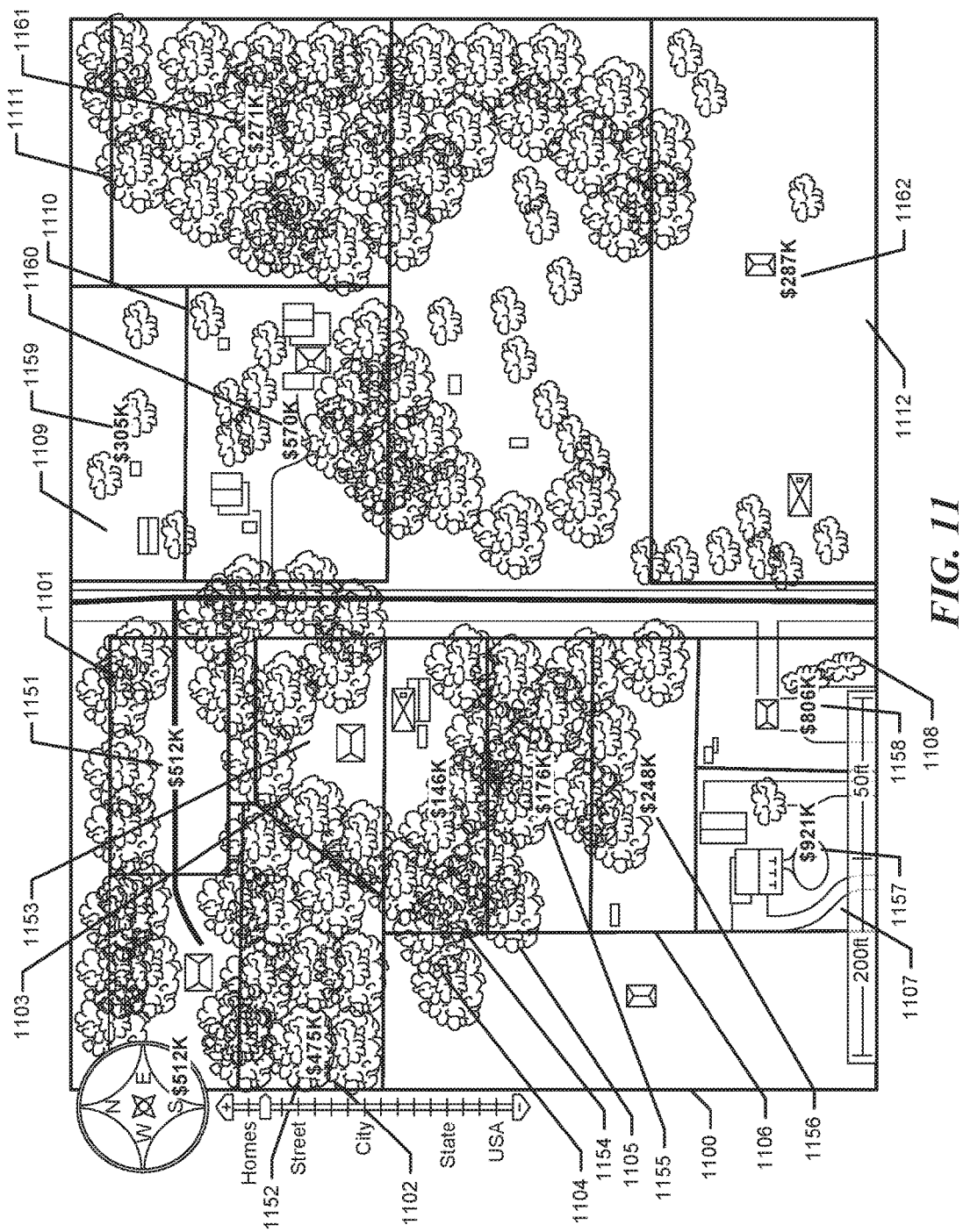
FIG. 11 is a display diagram showing a map identifying a number of homes in the same geographic area.

FIGS. 10-11 show ways in which valuations generated by the facility may be presented. FIG. 10 is a display diagram showing detailed information about an individual home. The display 1000 includes detailed information 1001 about the home. Despite the fact that the home has not been sold recently, the facility also displays a valuation 1002 for the home, enabling prospective buyers and listing agents to gauge their interest in the home, or permitting the home's owner to gauge his interest in listing the home for sale.

FIG. 11 is a display diagram showing a map identifying a number of homes in the same geographic area. The display 1100 shows homes 1101-1112. The facility also displays its valuations 1151-1162 of these homes in connection with their location on the map. Presenting the facility's valuations in this way permits home shoppers to obtain an overview of the geographic area, identify special trends within the geographic area, identify the anomalous values as good values or poor picks, etc.

In some embodiments, the valuations displayed or otherwise reported by the facility are not the "raw" valuations directly produced by the valuation model, but rather "smoothed" valuations that are generated by blending the raw valuation generated by the current iteration of the model with earlier valuations. As one example, in some embodiments, the facility generates a current smoothed valuation for a home by calculating a weighted average of a current raw valuation and a smoothed valuation of the same home from the immediately-preceding time period, where the prior smooth valuation is weighted more heavily than the current raw valuation. In some embodiments, where new iterations of the model are constructed and applied daily, the prior smoothed valuation is weighted 49 times as heavily as the current raw valuation; where a new iteration of the model is constructed and applied weekly, the prior smoothed valuation is weighted 9 times as heavily as the current raw valuation; where new iterations of the model are constructed and applied monthly, the previous smoothed valuation is weighted twice as heavily as the current raw valuation. Those skilled in the art will appreciate that a variety of other smoothing techniques may be used in order to dampen erratic movement in a particular home's reported valuation over time.

In some embodiments, the facility constructs and applies compound valuation models to one or more geographic areas. A compound valuation model includes two or more separate classification tree forests, some or all of which may be applied to the attributes of a particular home in order to value it. As one example, in some embodiments, the facility constructs a compound model including both a forest constructed as described above (referred to as a "core forest"), as well as a separate, "high-end" forest constructed from basis sales having a selling price above the 97.5 percentile selling price in the geographic area. In these embodiments, the compound model is applied as follows. First, the core forest is applied to the attributes of a home. If the valuation produced by the core forest is no larger than the 97.5 percentile selling price in the geographic area, then this valuation is used directly as the model's valuation. Otherwise, the facility also applies the high-end forest to the attributes of the home. If the valuation produced by the core forest is above the 99 percentile selling price, then the valuation produced by the high-end forest is used directly as the model's valuation. Otherwise, a weighted average of the valuations produced by the core forest and the high-end forest is used, where the weight of the core forest valuation is based upon nearness of the core model valuation to the 97.5 percentile selling price, while the weight of the high-end forest valuation is based on the nearness of the core forest valuation to the 99 percentile selling price.

In some embodiments, the facility uses valuations produced by the facility over time to calculate a price index for homes in particular geographic areas, which may be larger than, smaller than, or the same as the geographic areas that are the basis for individual valuation models. In order to calculate the index, the facility averages the valuations produced by the facility for houses in a geographic area at each a first and a second date, and generates an indication of the extent and direction of change. For example, the extent may be expressed in terms of dollars or some multiple of a particular number of dollars—such as $1,000—or as a percentage based upon either the first average valuation or the second valuation. The direction may be indicated by a plus or minus sign, an up or down arrow, etc. In some embodiments, the facility displays a visual indication of this price index as part of a visual representation of the corresponding geographic area, such as a map or an aerial photograph. Any visual representation that covers more than one geographic area may contain a price index indication for each such geographic area. In some embodiments, the facility provides these price indices in a variety of other ways, including a table, a chart, a data feed, etc.

It will be appreciated by those skilled in the art that the above-described facility may be straightforwardly adapted or extended in various ways. For example, the facility may use a wide variety of modeling techniques, house attributes, and/or data sources. The facility may display or otherwise present its valuations in a variety of ways. While the foregoing description makes reference to particular embodiments, the scope of the invention is defined solely by the claims that follow and the elements recited therein.

We claim:

1. A method, in a computing system having a memory and a processor, for valuing a distinguished home located in a distinguished geographic area, comprising:

retrieving, by the processor, home sales data for the distinguished geographic area from a plurality of source systems over a computer network, the home sales data comprising a plurality of entries each indicating, for a home located in the distinguished geographic area that was recently sold, a selling price, and, for each of a plurality of attributes, the value of the attribute for the home;

creating, by the processor, a plurality of classification trees for the distinguished geographic area;

storing each of the created plurality of classification trees for the distinguished area in the memory;
for each of the classification trees, by the processor:
randomly selecting a proper subset of the plurality of entries;
randomly selecting a proper subset of the plurality of attributes;
for each of the selected attributes, determining the full range of values of the selected attribute among the selected entries;
establishing a root node representing all of the selected entries and the full range of values of each of the selected attributes;
for each node of the tree:
determining the information gain borne by each possible split of each of the ranges of the selected attributes represented by the node to the selling prices of the entries represented by the node;
when the greatest information gain of a possible split exceeds the information gain of the node:
performing the possible split having the greatest information gain to divide the range into two subranges at a point in the attribute range that produces the largest variance between an average selling price for the subranges to an average selling price for the range;
for each of the two subranges, establishing a child of the node representing the subrange and the homes represented by the node whose attribute values fall into the subrange;
when the greatest information gain of a possible split does not exceed the information gain of the node, identifying the node as a leaf node and calculating a mean selling price for the homes represented by the node;
for each of a proper subset of the plurality of entries that excludes the selected entries:
identifying a leaf node of the classification tree representing attribute ranges containing the entry's attributes;
comparing the price of the identified leaf node to the selling price of the entry;
scoring the classification tree based on the extent to which the prices of the identified leaf nodes differed from the corresponding selling prices;
receiving, by the processor, attributes of the distinguished home from a user device over the computer network;
for each of the classification trees, identifying, by the processor, a leaf node of the classification tree representing attribute ranges containing the distinguished home's attributes;
determining, by the processor, an average of the price of the identified leaf node in each of the trees that is weighted by the tree's score; and
reporting the determined average as the value of the distinguished home to the user device.

2. A computer-readable medium not constituting transitory signals whose contents cause a computing system to perform a method for valuing a distinguished home located in a distinguished geographic area in cooperation with a memory, the method comprising:
receiving home attributes for the distinguished home from a client device over a computer network;
storing the received home attributes in the memory;
obtaining, with the processor, a valuation for the distinguished home by applying to the home attributes stored in the memory a weighted classification tree-based valuation model, stored in the memory, for homes in the distinguished geographic area trained using selling price and home attribute data from homes recently sold in the distinguished geographic area,
wherein the valuation model is a compound model that includes a component for all homes in the distinguished geographic area, as well as a component for the most highly-valued homes in the distinguished geographic area; and
reporting, with the processor, the obtained valuation for the distinguished home to the client device.

3. The computer-readable medium not constituting transitory signals of claim 2 wherein the received home attributes are retrieved from a database of public information.

4. The computer-readable medium not constituting transitory signals of claim 2 wherein the received home attributes are inputted by a person knowledgeable about the attributes of the distinguished home.

5. The computer-readable medium not constituting transitory signals of claim 2 wherein the compound valuation model is applied by first applying the component for all homes in the distinguished geographic area, and using the produced valuation to weight valuations generated for the home by the two components in the reported valuation.

6. The computer-readable medium not constituting transitory signals of claim 2, further comprising:
determining that a home attribute value for the distinguished home is unavailable; and
in response to the determination, imputing a value for the attribute for the distinguished home.

7. The computer-readable medium not constituting transitory signals of claim 6, further comprising choosing as the imputed attribute value the median value of the attribute among homes recently sold in the distinguished geographic area.

8. The computer-readable medium not constituting transitory signals of claim 6, further comprising choosing as the imputed attribute value the mode value of the attribute among homes recently sold in the distinguished geographic area.

9. The computer-readable medium not constituting transitory signals of claim 2, the method further comprising, before reporting the obtained valuation for the distinguished home, blending into the obtained valuation an earlier-reported valuation for the distinguished home.

10. The computer-readable medium not constituting transitory signals of claim 9 wherein the blending comprises generating a weighted average of the obtained valuation and the earlier-reported valuation in which the earlier-reported valuation is more heavily weighted than the obtained valuation.

11. The computer-readable medium not constituting transitory signals of claim 2 wherein the valuation model is comprised of a first constituent valuation model trained using selling price and home attribute data from homes recently sold in the distinguished geographic area at the highest selling prices and a second constituent valuation model trained using selling price and home attribute data from homes recently sold in the distinguished geographic area at all selling prices, and wherein obtaining a valuation for the distinguished home comprises blending the constituent valuations obtained by applying each of the constituent valuation models to the received home attributes.

12. The computer-readable medium not constituting transitory signals of claim 2 wherein the valuation model is comprised of a first constituent valuation model trained using selling price and home attribute data from homes recently sold in the distinguished geographic area at the highest selling prices and a second constituent valuation model trained using selling price and home attribute data from homes recently sold in the distinguished geographic area at all selling prices, and wherein obtaining a valuation for the distinguished home comprises:
   applying the second constituent model to obtain the second constituent valuation;
   if the obtained second constituent valuation is below a threshold percentile among selling prices in the geographic area, using the second constituent valuation as the valuation;
   if the second constituent valuation is above the threshold percentile selling price in the geographic area:
      applying the first constituent valuation model to obtain a first constituent valuation; and
      computing a weighted average of the constituent valuations in which the weighting is based upon the extent to which the second constituent valuation exceeds the threshold percentile selling price in the geographic area to obtain the valuation.

13. A method, in a computing system having a processor and a memory, for establishing a valuation model for homes in a distinguished geographic area, comprising:
   receiving, by the processor, sales information for homes in the distinguished geographic area sold after a distinguished past date from a plurality of source systems over a computer network, the sales information including home attributes and selling price for each home;
   storing the received sales information in the memory;
   initializing, by the computer system, a valuation model, stored in the memory, that is a forest of classification trees; and
   training, by the computer system, the initialized valuation model with the sales information stored in the memory for at least a portion of the homes in the distinguished geographic area sold after the distinguished past date, such that the trained valuation model values each of these homes at or near its selling price, wherein each of classification trees stored in the memory is weighted based upon a level of success of the classification tree in valuing homes in the distinguished geographic area that were recently sold other than those used to train the valuation model.

14. The method of claim 13 wherein the valuation model is trained using the identified sales information for a first proper subset of homes in the distinguished geographic area sold after the distinguished past date, the method further comprising:
   selecting a second proper subset of homes in the distinguished geographic area sold after the distinguished past date that is distinct from the first proper subset; and
   using identified sales information for the second proper subset of homes to validate the trained valuation model by determining the extent to which the trained valuation model's valuation of the homes of the second proper subset diverges from the selling prices of the homes of the second proper subset.

15. The method of claim 13, further comprising:
   identifying among the homes in the distinguished geographic area sold after the distinguished past date homes that have undergone unusually rapid appreciation or depreciation; and
   excluding the identified homes from the training of the valuation model.

16. The method of claim 15 wherein homes are identified whose change in selling price from second most recent sale to most recent sale lies outside a predetermined percentage range.

17. The method of claim 16, further comprising choosing as the imputed attribute value the median value of the attribute among homes in the distinguished geographic area sold after the distinguished date.

18. The method of claim 16, further comprising choosing as the imputed attribute value the mode value of the attribute among homes in the distinguished geographic area sold after the distinguished date.

19. The method of claim 15, further comprising:
   selecting from the homes in the distinguished geographic area sold after the distinguished past date homes whose change in selling price from second most recent sale to most recent sale lies within a first predetermined percentage range;
   initializing and training a second valuation model with identified sales information for the selected homes; and
   applying the second valuation model to all of the homes in the distinguished geographic area sold after the distinguished past date, and wherein homes are identified whose difference between selling price from second most recent sale to valuation obtained by applying the second valuation model lies outside a second predetermined percentage range.

20. The method of claim 13, further comprising:
   identifying a home in the distinguished geographic area sold after the distinguished past date having an attribute for which no value is available; and
   in response to the identifying, imputing a value of the attribute for the identified home.

21. The method of claim 13, further comprising:
   identifying a home in the distinguished geographic area sold after the distinguished past date for which no selling price is available; and
   in response to the identifying, imputing a selling price for the identified home.

22. The method of claim 21, further comprising:
   choosing as the imputed selling price the product of a loan amount and an estimated regional home-to-value ratio.

23. One or more computer memories, not constituting transitory signals, collectively storing:
   a forest of classification tree data structures usable to value homes in a distinguished geographic area, each of the trees of the forest classifying a random subset of homes and their recent selling prices based on values of a random subset of known home attributes,
   such that the forest may be used to value a home in the distinguished geographic area based upon its home attributes,
   wherein associated with each tree of the forest is a weight indicating the likely level of accuracy of values produced by the tree relative to the other trees.

24. A method, in a computing system having a processor and a memory, of valuing a distinguished home located in a distinguished geographic area, comprising:
   receiving, by the processor, home attributes for the distinguished home from a plurality of source systems over a computer network;
   storing the home attributes in the memory;
   obtaining, by a processor, a valuation for the distinguished home by applying to the home attributes stored in the memory a weighted classification tree-based valuation model for homes in the distinguished geographic area trained using selling price and home attribute data from homes recently sold in the distinguished geographic area, wherein the valuation model is a compound model that includes a component for all homes in the distinguished geographic area, as well as a component for the most highly-valued homes in the distinguished geographic area; and reporting the obtained valuation for the distinguished home to a client device over the computer network.

25. A computing system for establishing a valuation model for homes in a distinguished geographic area, comprising:

a processor and memory, together comprising:

an identifying unit configured to identify sales information for homes in the distinguished geographic area sold after a distinguished past date from a plurality of source systems across a computer network, the sales information including home attributes and selling price for each home;

an initializing unit configured to initialize a valuation model that is a forest of classification trees; and a training unit configured to train the initialized valuation model with the identified sales information for at least a portion of the homes in the distinguished geographic area sold after the distinguished past date, such that the trained valuation model values each of these homes at or near its selling price, wherein each of classification trees is weighted based upon a level of success of the classification tree in valuing homes in the distinguished geographic area that were recently sold other than those used to train the valuation model.

* * * * *